US012044988B2

(12) United States Patent
Taniguchi

(10) Patent No.: US 12,044,988 B2
(45) Date of Patent: Jul. 23, 2024

(54) IMAGE FORMING APPARATUS

(71) Applicant: CANON KABUSHIKI KAISHA, Tokyo (JP)

(72) Inventor: Koichi Taniguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/137,124

(22) Filed: Apr. 20, 2023

(65) Prior Publication Data

US 2023/0341794 A1 Oct. 26, 2023

(30) Foreign Application Priority Data

Apr. 22, 2022 (JP) ................................ 2022-071201

(51) Int. Cl.
*G03G 15/00* (2006.01)
*G03G 15/16* (2006.01)

(52) U.S. Cl.
CPC ................................ *G03G 15/1615* (2013.01)

(58) Field of Classification Search
CPC ............. G03G 15/161; G03G 15/1615; G03G 15/6558
USPC ...................................................... 399/38, 66
See application file for complete search history.

(56) References Cited

U.S. PATENT DOCUMENTS 9,304,472 B2 4/2016 Ishikawa
9,465,347 B2 * 10/2016 Hagiwara ............ G03G 15/161
2021/0263450 A1 * 8/2021 Sakaguchi ......... G03G 15/6558
2021/0397112 A1 * 12/2021 Tsuruga ............... G03G 15/161
2021/0397113 A1 12/2021 Kakehi et al.
2023/0341795 A1 10/2023 Taniguchi

FOREIGN PATENT DOCUMENTS

| | | | |
|---|---|---|---|
| EP | 2 762 979 | A2 | 8/2014 |
| EP | 3 926 409 | A1 | 12/2021 |
| JP | 2010-152008 | A | 7/2010 |
| JP | 2012-88626 | A | 5/2012 |
| JP | 5935699 | B2 | 6/2016 |
| JP | 2021-124682 | A | 8/2021 |

OTHER PUBLICATIONS

Extended European Search Report dated Sep. 22, 2023, in European Application No. 23163043.5.

* cited by examiner

*Primary Examiner* — Hoan H Tran
(74) *Attorney, Agent, or Firm* — Venable LLP

(57) ABSTRACT

An image forming apparatus includes a plurality of image forming portions, a rotatable endless belt, a plurality of stretching rollers including an inner roller, an outer roller, a position changing mechanism, and a controller. During execution of a job for forming first toner images on a first recording material and second toner images on a second recording material subsequent to the first recording material, in a case that a changing operation for changing the position of the inner roller by the position changing mechanism after the first toner images are formed on the first recording material and before the second to toner images are transferred onto the second recording material is executed, a registration adjusting image is formed between the first toner images and the second toner images.

15 Claims, 17 Drawing Sheets

IMAGE FORMING APPARATUS

FIELD OF THE INVENTION AND RELATED ART

The present invention relates to an image forming apparatus, such as a copying machine, a printer, or a facsimile machine, of an electrophotographic type or an electrostatic recording type.

Conventionally, as the image forming apparatus of the electrophotographic type, there is an image forming apparatus using an endless belt as an image bearing member for bearing a toner image. As such a belt, for example, there is an intermediary transfer belt used as a second image bearing member for transferring an image to a sheet-like recording material such as paper, the image having been transferred to the belt from a photosensitive member or the like as a first image bearing member.

In the image forming apparatus using the intermediary transfer belt, a toner image formed on the photosensitive member or the like is primary-transferred onto the intermediary transfer belt at a primary transfer portion. Then, the toner image primary-transferred on the intermediary transfer belt is secondary-transferred onto the recording material at a secondary transfer portion. By an inner member (inner secondary transfer member) provided on an inner peripheral surface side and an outer member (outer secondary transfer member) provided on an outer peripheral surface side, a secondary transfer portion (secondary transfer nip) which is a contact portion between the intermediary transfer belt and the outer member is formed. As the inner member, an inner secondary transfer roller (hereinafter, simply referred to as an "inner roller") which is one of a plurality of stretching rollers for stretching the intermediary transfer belt is used. As the outer member, an outer secondary transfer roller hereinafter, simply referred also to as an "outer roller") which is provided in a position opposing the inner roller while nipping the intermediary transfer belt between itself and the inner roller and which is pressed toward the inner roller is used in many instances. Further, a secondary transfer voltage of a polarity opposite to a charge polarity of toner is applied to the outer roller (or a voltage of the same polarity as the charge polarity of the toner is applied to the inner roller), so that the toner image is secondary-transferred from the intermediary transfer belt onto the recording material in the secondary transfer portion. In general, with respect to a feeding direction of the recording material, on a side upstream of the secondary transfer portion, a feeding guide for guiding the recording material to the secondary transfer portion is provided.

Here, it has been known that depending on rigidity of the recording material, behavior of the recording material changes in the neighborhoods of the secondary transfer portion on sides upstream and downstream of the secondary transfer portion with respect to the recording material feeding direction, and has an influence on an image which is a product in some instances.

For example, in the case where the recording material is "thin paper" which is an example of the recording material with small rigidity, in the neighborhood of the secondary transfer nip on the side downstream of the secondary transfer portion with respect to the recording material feeding direction, the intermediary transfer belt and the recording material stick to each other, so that a jam (paper jam) occurs in some instances due to improper separation of the recording material from the intermediary transfer belt.

On the other hand, in the case where the recording material is "thick paper" which is an example of the recording material with large rigidity, when a trailing end portion, with respect to a recording material feeding direction of the recording material passes through the feeding guide, the trailing end portion of the recording material with respect to the recording material feeding direction collides with the intermediary transfer belt in some instances. Further, with respect to the recording material feeding direction, an attitude of the intermediary transfer belt in the neighborhood of the secondary transfer portion on the upstream side is disturbed, so that an image defect (a stripe-shaped image disturbance or the like extending in a direction substantially perpendicular to the recording material feeding direction) occurs at the trailing end portion of the recording material in some instances.

In recent years, for example, in a commercial printing market required to meet diversifying recording materials, these problems become apparent in many instances. Therefore, a constitution in which a shape (position) of the secondary transfer portion is changed depending on a kind of the recording material has been proposed (Japanese Patent No. 5935699.

As described above, for example, in order to realize improvement in separating property of the recording material from the intermediary transfer belt and suppression of the image defect at the trailing end portion of the recording material, it is effective that a shape (nip shape or position nip position) of the secondary transfer portion is changed depending on the kind of the recording material. This change in shape (position) of the secondary transfer portion can be made by changing a relative position (represented by, for example, an "offset amount" described later) between the inner roller and the outer roller with respect to a circumferential direction of the inner roller through movement of at least one of the inner roller or the outer roller.

However, by moving the roller(s) (member(s) contacting the roller(s)) stretching the intermediary transfer belt, alignment between one end portion and the other end portion (front and rear end portions) of the roller(s), with respect to a rotational axis direction, stretching the intermediary transfer belt changes in some instances. Further, when such a change in alignment occurs, an attitude of the intermediary transfer belt in which the intermediary transfer belt can stably move (travel) changes.

Incidentally, there is a constitution in which a pressing member for pressing an inner peripheral surface of the intermediary transfer belt is provided in the neighborhood of an upstream side of the secondary transfer portion and in which a shape (stretching shape, attitude) of the intermediary transfer belt on a side upstream of the secondary transfer portion is changed by making a pressing amount of the pressing member against the intermediary transfer belt variable. Also, the influence of such a change in shape of the intermediary transfer belt in the neighborhood of the secondary transfer portion on a moving (travelling) attitude of the intermediary transfer belt is similar to the influence in the case of the change in relative position between the inner roller and the outer roller described above.

By the change in attitude of the intermediary transfer belt in which the intermediary transfer belt can stably move, in an image forming apparatus of a tandem type, when the intermediary transfer belt is moved from an upstream image forming portion toward a downstream image forming portion with respect to a rotational axis direction, a movement amount of the intermediary transfer belt with respect to a widthwise direction of the intermediary transfer belt changes. For that reason, a relative positional deviation between toner images formed by the respective image forming portions so-called "color misregistration") occurs. In the following, the relative positional deviation between the toner images formed by the respective image forming portions is also referred to as the "color misregistration".

SUMMARY OF THE INVENTION

A principal object of the present invention is to suppress color misregistration with a change in position (shape) of a transfer portion or in shape (attitude) of a belt in the neighborhood of the transfer portion in a constitution in which such a change can be made.

The object has been accomplished by the image forming apparatus according to the present invention.

According to an aspect of the present invention, there is provided an image forming apparatus comprising: a plurality of image forming portions configured to form toner images; a rotatable endless belt on which the toner images are formed by the image forming portions; a plurality of stretching rollers configured to stretch the belt, the stretching rollers including an inner roller configured to form a transfer portion where the toner images are transferred from the belt onto a recording material; an outer roller configured to form the transfer portion between itself and the inner roller; a position changing mechanism capable of changing a position of the transfer portion with respect to a circumferential direction of the inner roller by changing a position of the inner roller; an image detecting portion configured to detect an image, and a controller configured to execute an adjusting operation in which a registration adjusting image is formed by the image forming portions and is detected by the image detecting portion and then in which on the basis of a detection result of the registration adjusting image by the image detecting portion, adjustment of image writing positions of the image forming portions is made, wherein during execution of a job for forming first toner images on a first recording material and second toner images on a second recording material subsequent to the first recording material, in a case that a changing operation for changing the position of the inner roller by the position changing mechanism after the first toner images are formed on the first recording material and before the second toner images are transferred onto the second recording material is executed, the registration adjusting image is formed between the first toner images and the second toner images.

According to another aspect of the present invention, there is provided an image forming apparatus comprising: a plurality of image forming portions configured to form toner images; a rotatable endless belt on which the toner images are formed by the image forming portions; a plurality of stretching rollers configured to stretch the belt, the stretching rollers including an inner roller configured to form a transfer portion where the toner images are transferred from the belt onto a recording material and including an upstream roller provided upstream of and adjacent to the inner roller with respect to a rotational direction of the belt; an outer roller provided opposed to the inner roller and configured to form the transfer portion between itself and the inner roller; a pressing member provided upstream of the inner roller and downstream of the upstream roller and configured to be contactable to an inner peripheral surface of the belt and be capable of pressing the belt from an inner peripheral surface side toward an outer peripheral surface side of the belt; a position changing mechanism configured to change a position of the pressing member; an image detecting portion configured to detect an image; and a controller configured to execute an adjusting operation in which a registration adjusting image is formed by the image forming portions and is detected by the image detecting portion and then in which on the basis of a detection result of the registration adjusting image by the image detecting portion, adjustment of image writing positions of the image forming portions is made, wherein during execution of a job for forming first toner images on a first recording material and second toner images on a second recording material subsequent to the first recording material, in a case that a changing operation for changing the position of the pressing member by the position changing mechanism after the first toner images are formed on the first recording material and before the second toner images are transferred onto the second recording material is executed, the registration adjusting image is formed between the first toner images and the second toner images.

According to a further aspect of the present invention, there is provided an image forming apparatus comprising: a plurality of image forming portions configured to form toner images; a rotatable endless belt on which the toner images are formed by the image forming portions; a plurality of stretching rollers configured to stretch the belt, the stretching rollers including an inner roller configured to form a transfer portion where the toner images are transferred from the belt onto a recording material and including an upstream roller provided upstream of and adjacent to the inner roller with respect to a rotational direction of the belt; an outer roller provided opposed to the inner roller and configured to form the transfer portion between itself and the inner roller; a pressing member provided upstream of the inner roller and downstream of the upstream roller and configured to be contactable to an inner peripheral surface of the belt and be capable of pressing the belt from an inner peripheral surface side toward an outer peripheral surface side of the belt; a position changing mechanism configured to change a position of the pressing member to a first position and a second position; an image detecting portion configured to detect a registration adjusting image formed by the image forming portions; a controller configured to execute an adjusting operation for adjusting image writing positions of the image forming portions, wherein the adjusting operation is an operation in which the registration adjusting image is formed by the image forming portions and then in which on the basis of a detection result of the formed registration adjusting image by the image detecting portion, an adjusting value for adjusting the image writing positions is acquired; a first storing portion configured to store a first adjusting value acquired by the controller by executing the adjusting operation when the position of the pressing member is the first position; and a second storing portion configured to store a second adjusting value acquired by, the controller by, executing the adjusting operation when the position of the pressing member is the second position.

Further features of the present invention will become apparent from the following description of exemplary embodiments with reference to the attached drawings.

Figure 4:
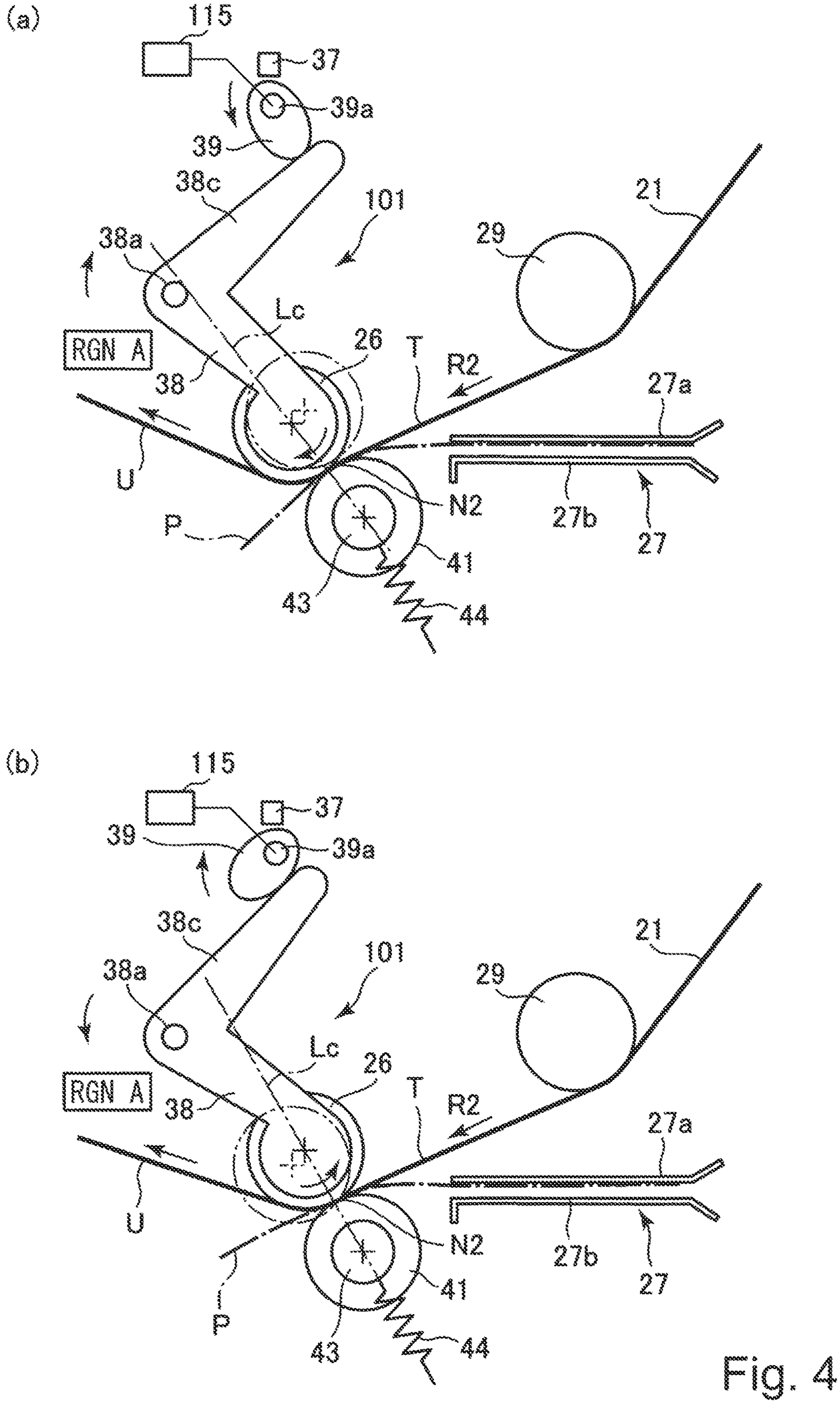

Parts (a) and (b) of FIG. 4 are schematic side views showing an offset mechanism.

Figure 5:
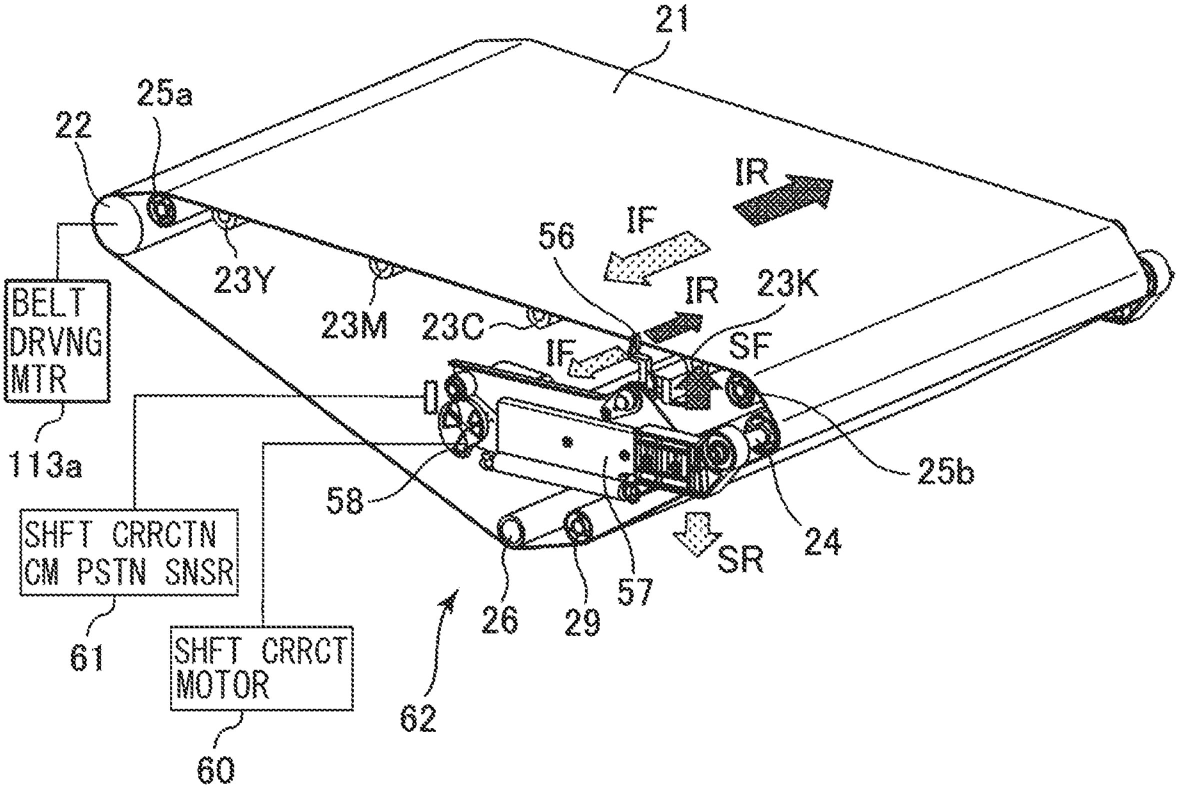

FIG. 5 is a schematic perspective view showing a steering mechanism.

Figure 6:
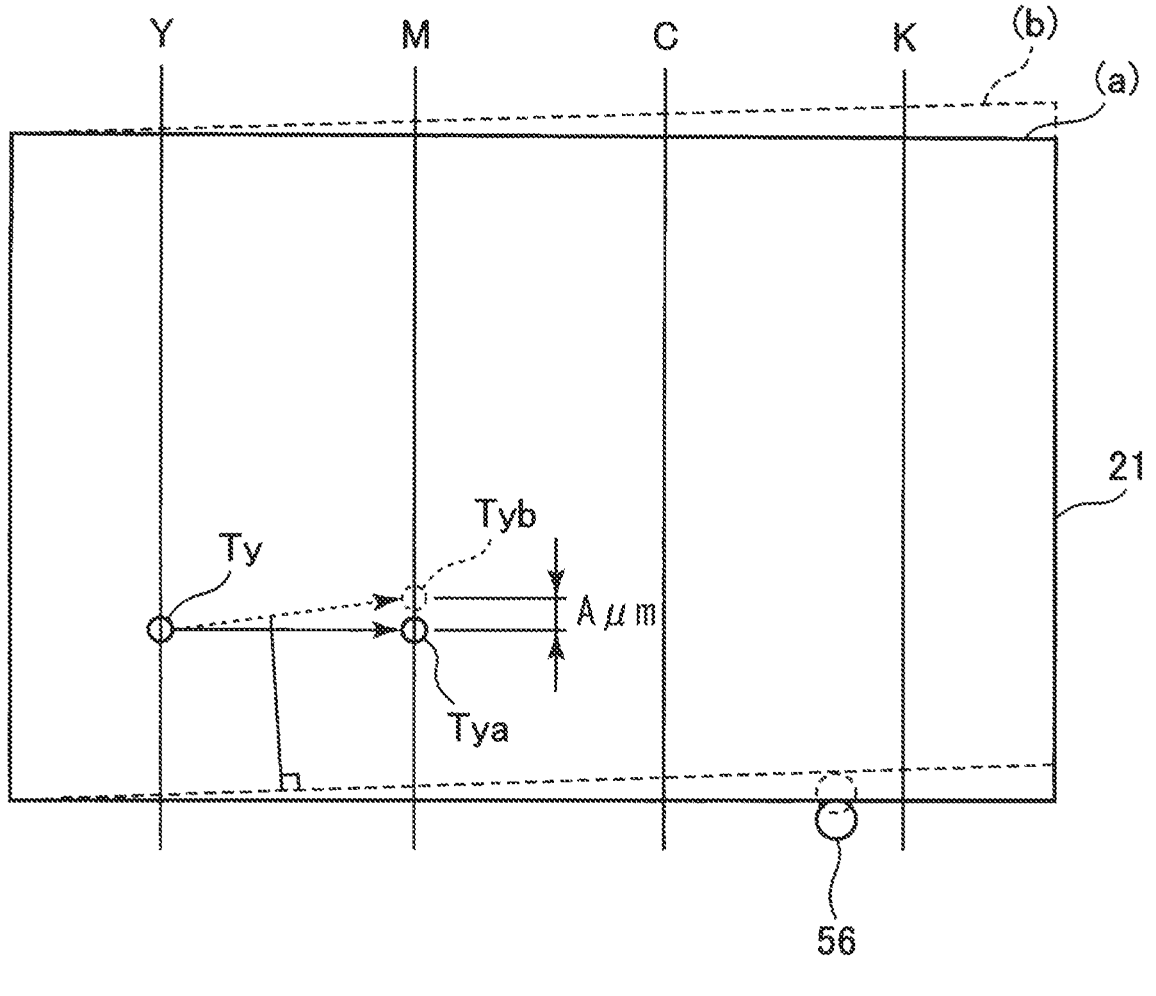

FIG. 6 is a schematic view for illustrating color misregistration due to a change in attitude of an intermediary transfer belt.

Figure 7:
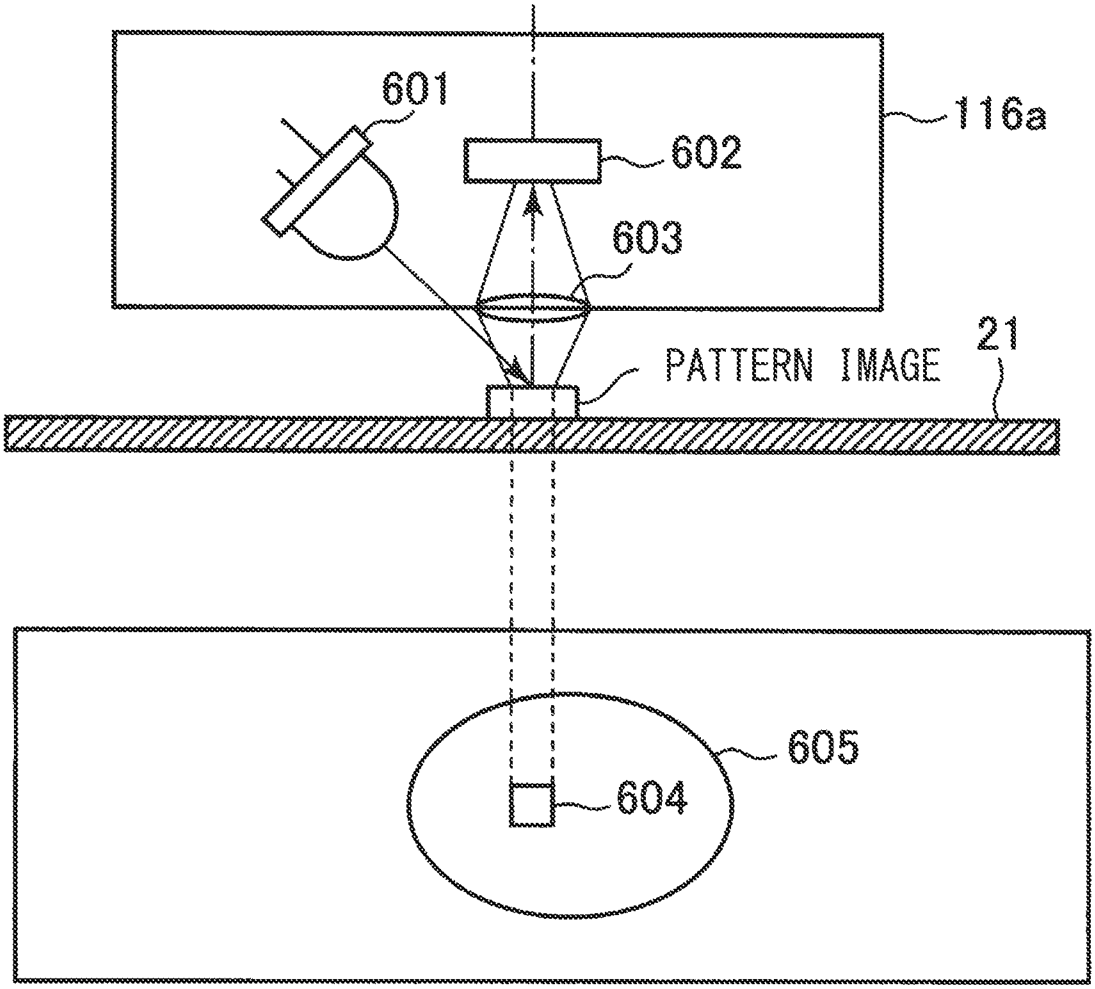

FIG. 7 is a schematic view for illustrating a constitution of a toner detecting sensor.

Figure 8:
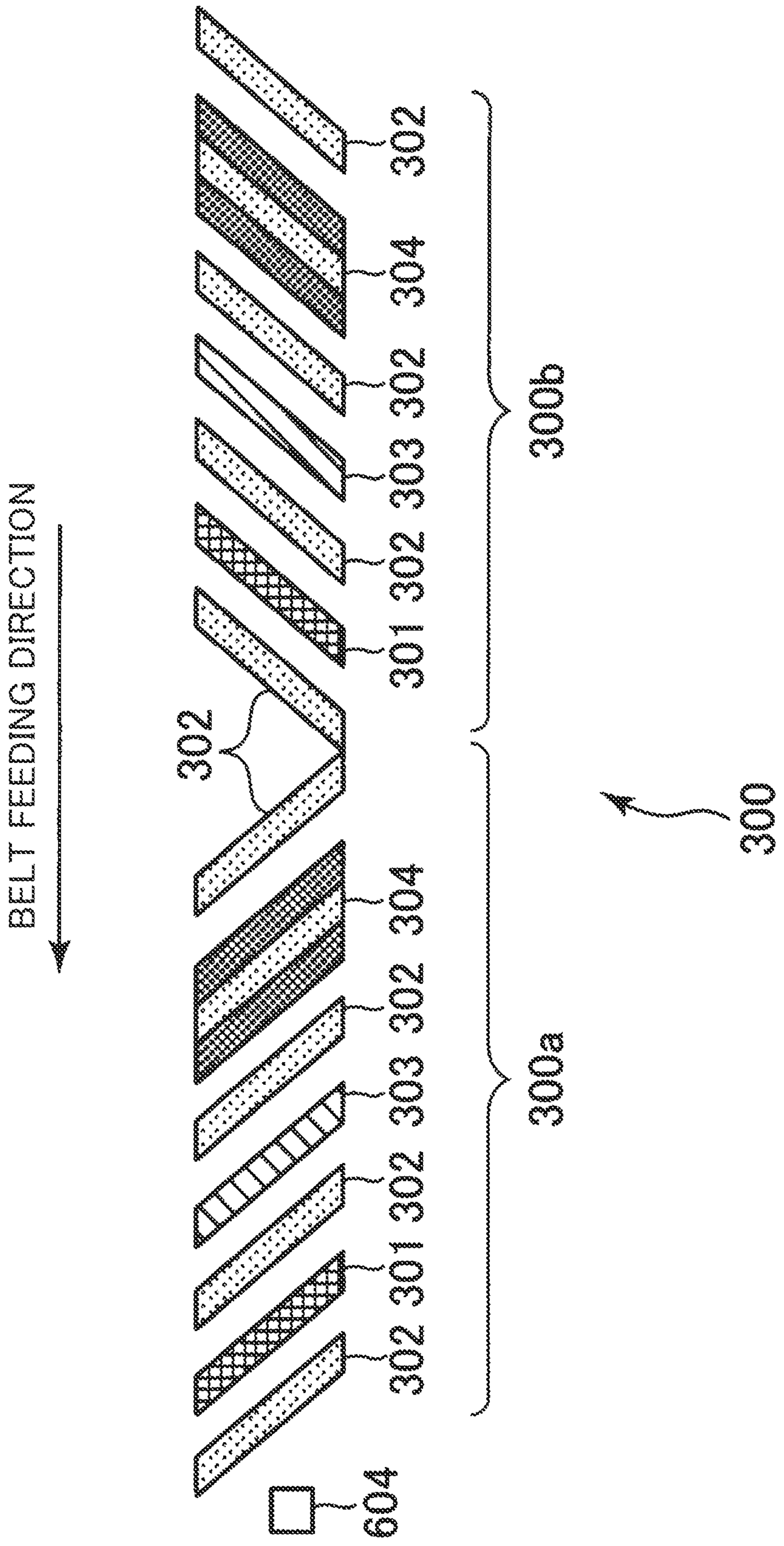

FIG. 8 is a schematic view showing a pattern image in color registration adjustment.

Figure 9:
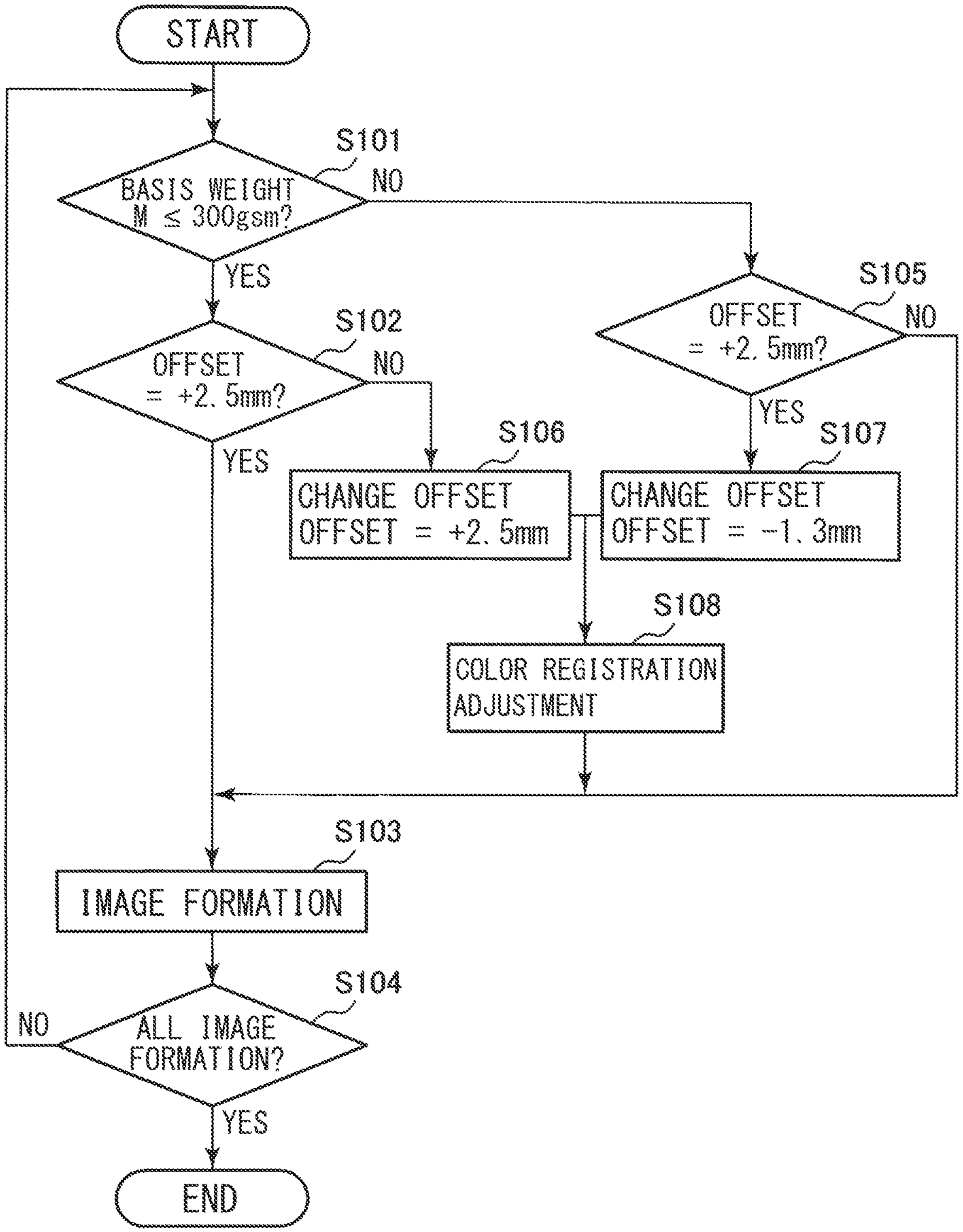

FIG. 9 is a flowchart of control in an embodiment 1.

Figure 10:
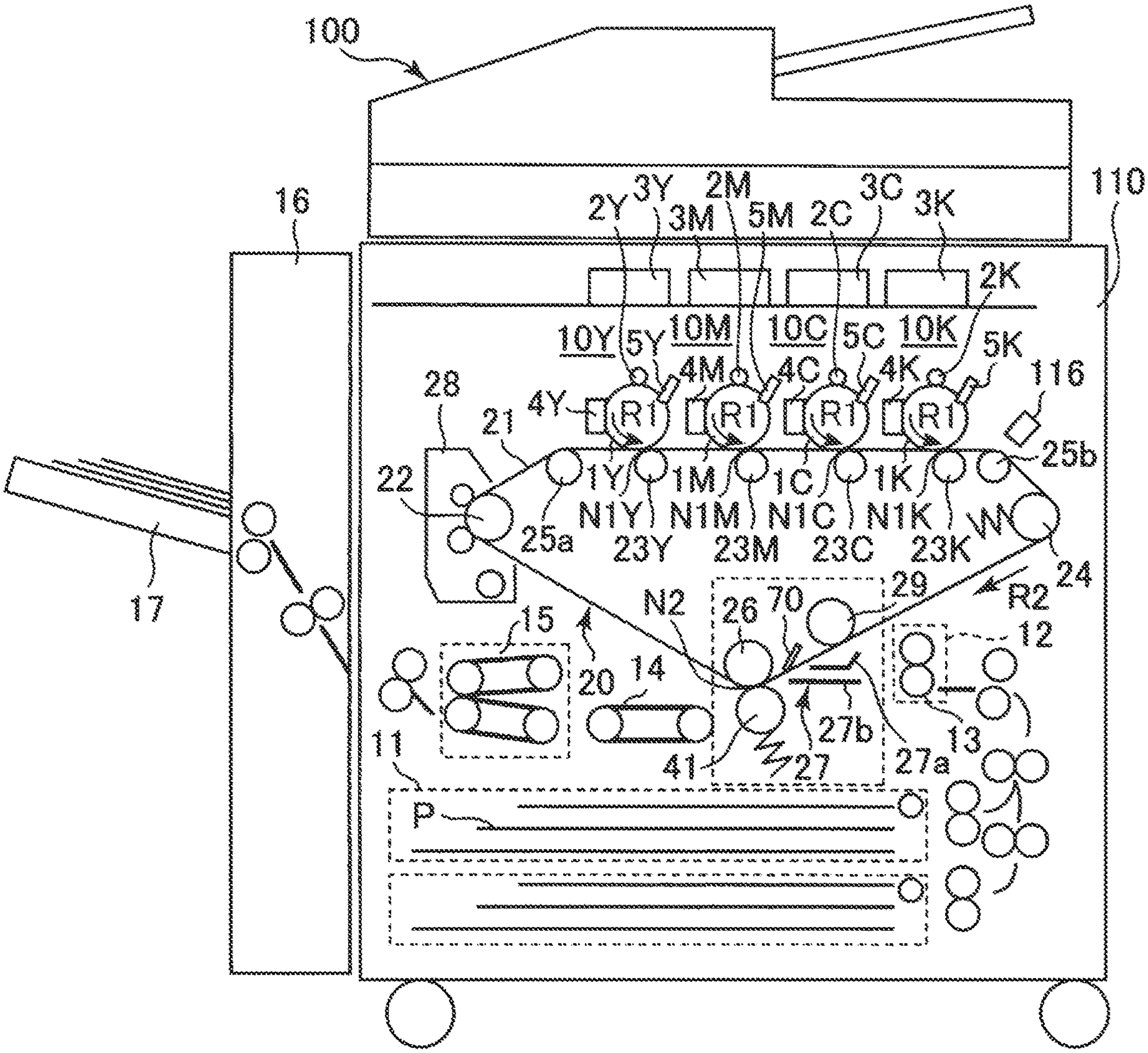

FIG. 10 is a schematic sectional view of another example of the image forming apparatus.

Figure 11:
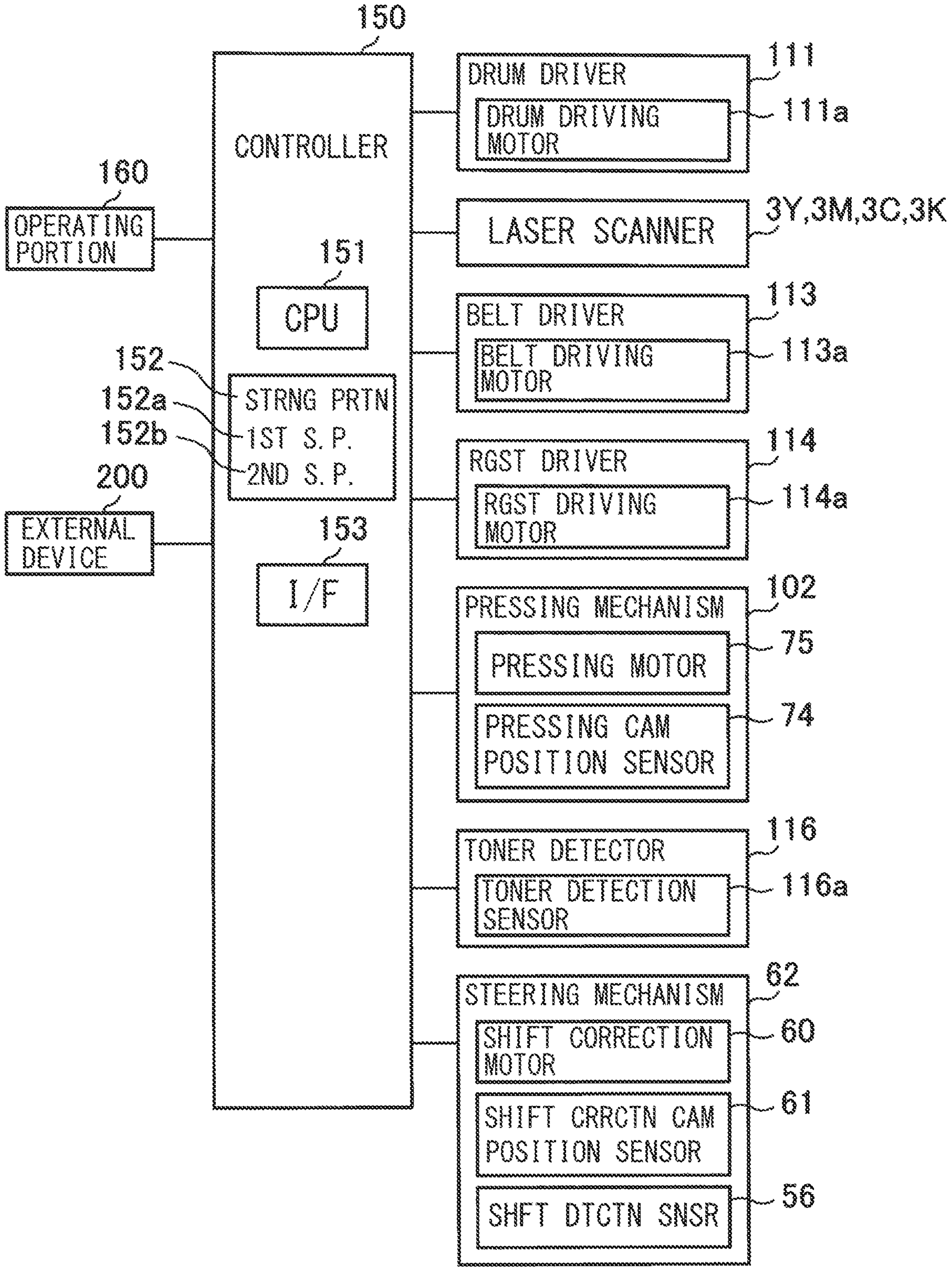

FIG. 11 is a schematic block diagram showing a control mode of another example of the image forming apparatus.

Figure 12:
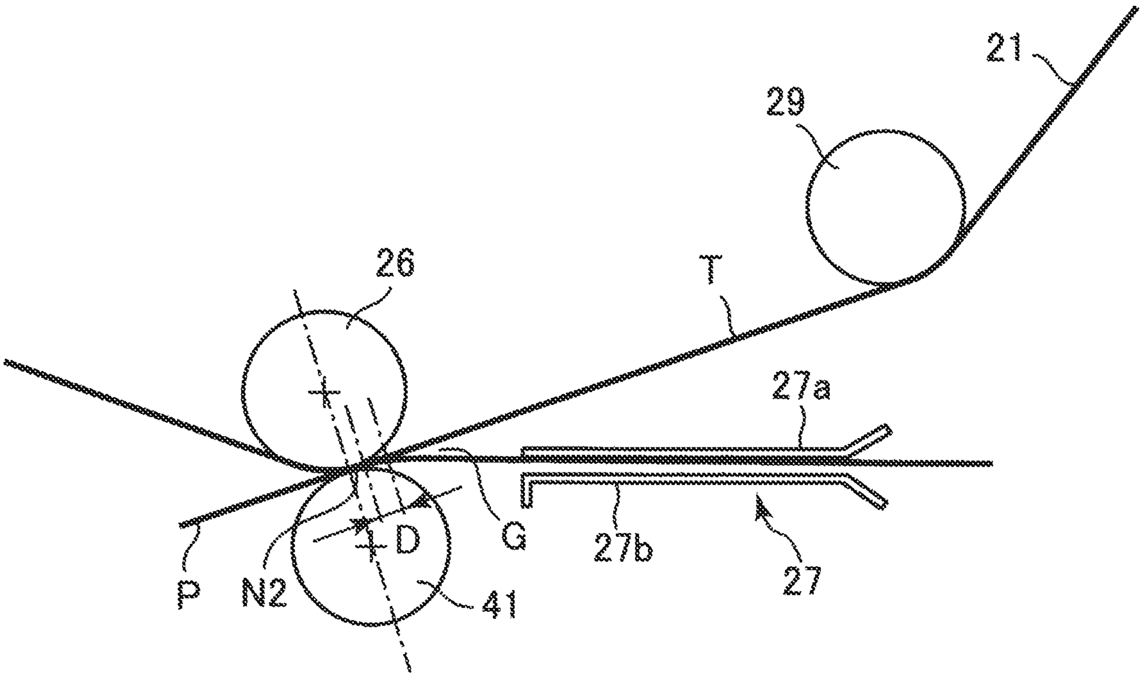

FIG. 12 is a schematic sectional view for illustrating a feeding attitude of a recording material.

Figure 13:
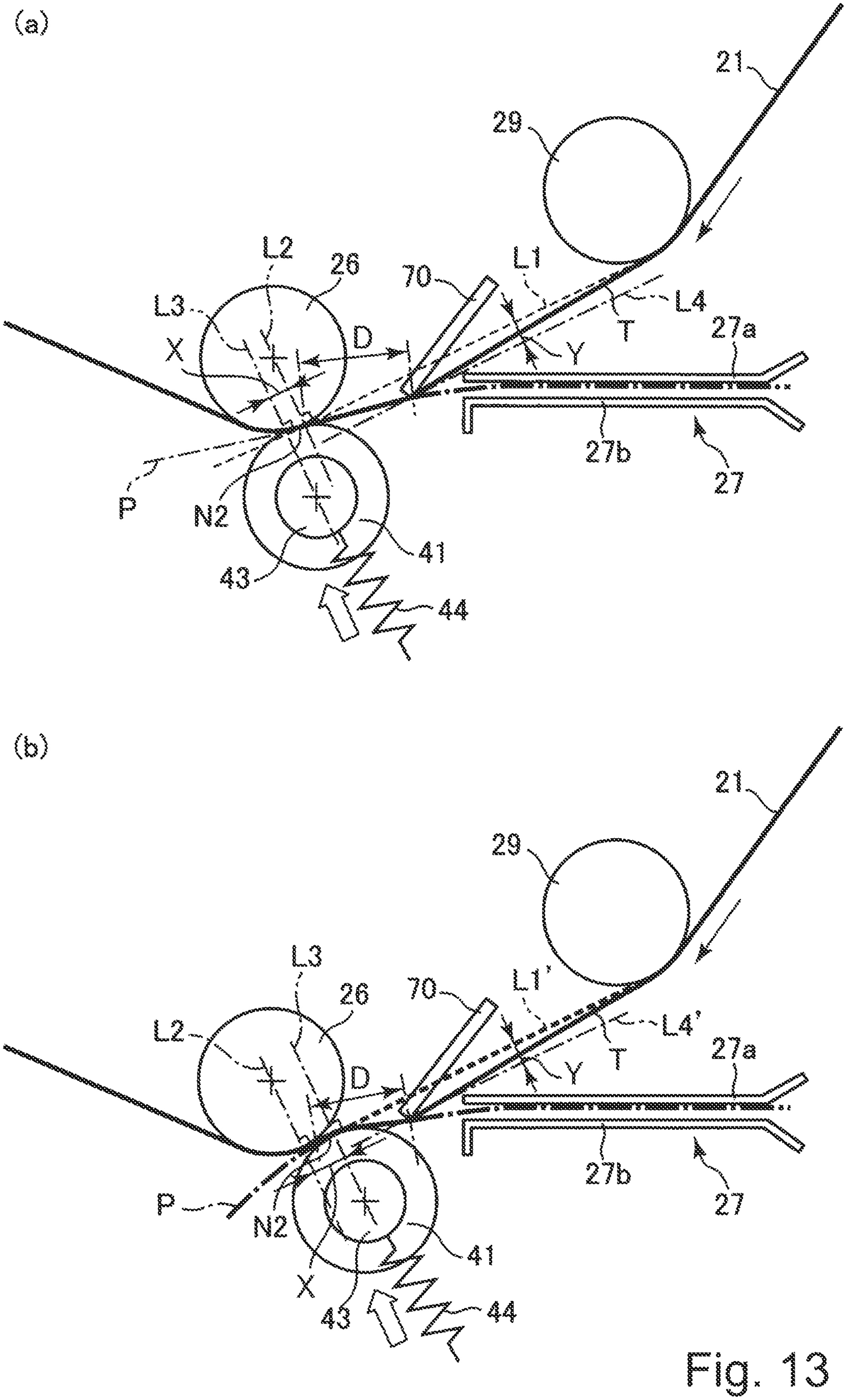

Parts (a) and (b) of FIG. 13 are schematic sectional views for illustrating a penetration amount (pressing amount).

Figure 14:
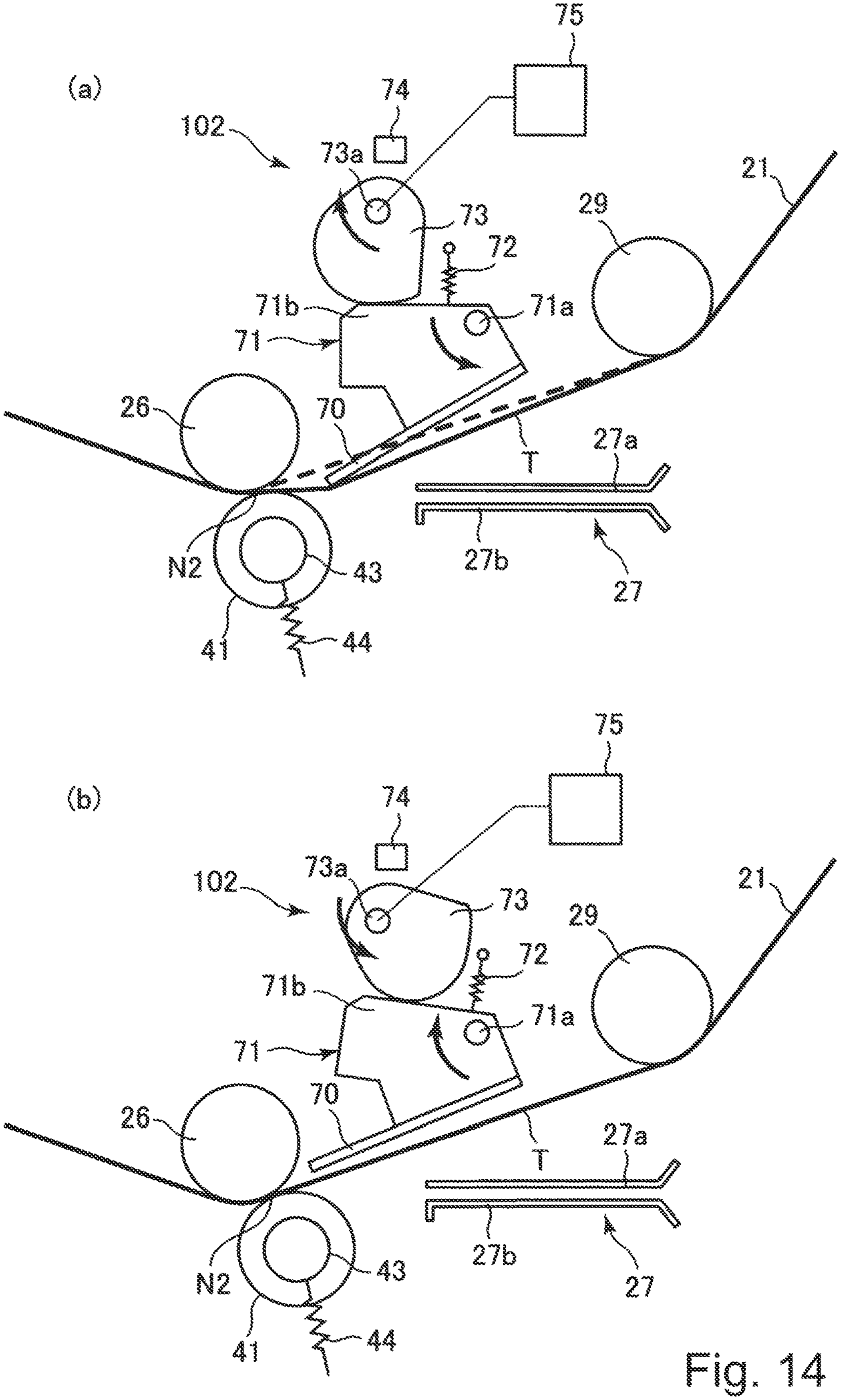

Parts (a) and (b) of FIG. 14 are schematic side views showing a pressing mechanism.

Figure 15:
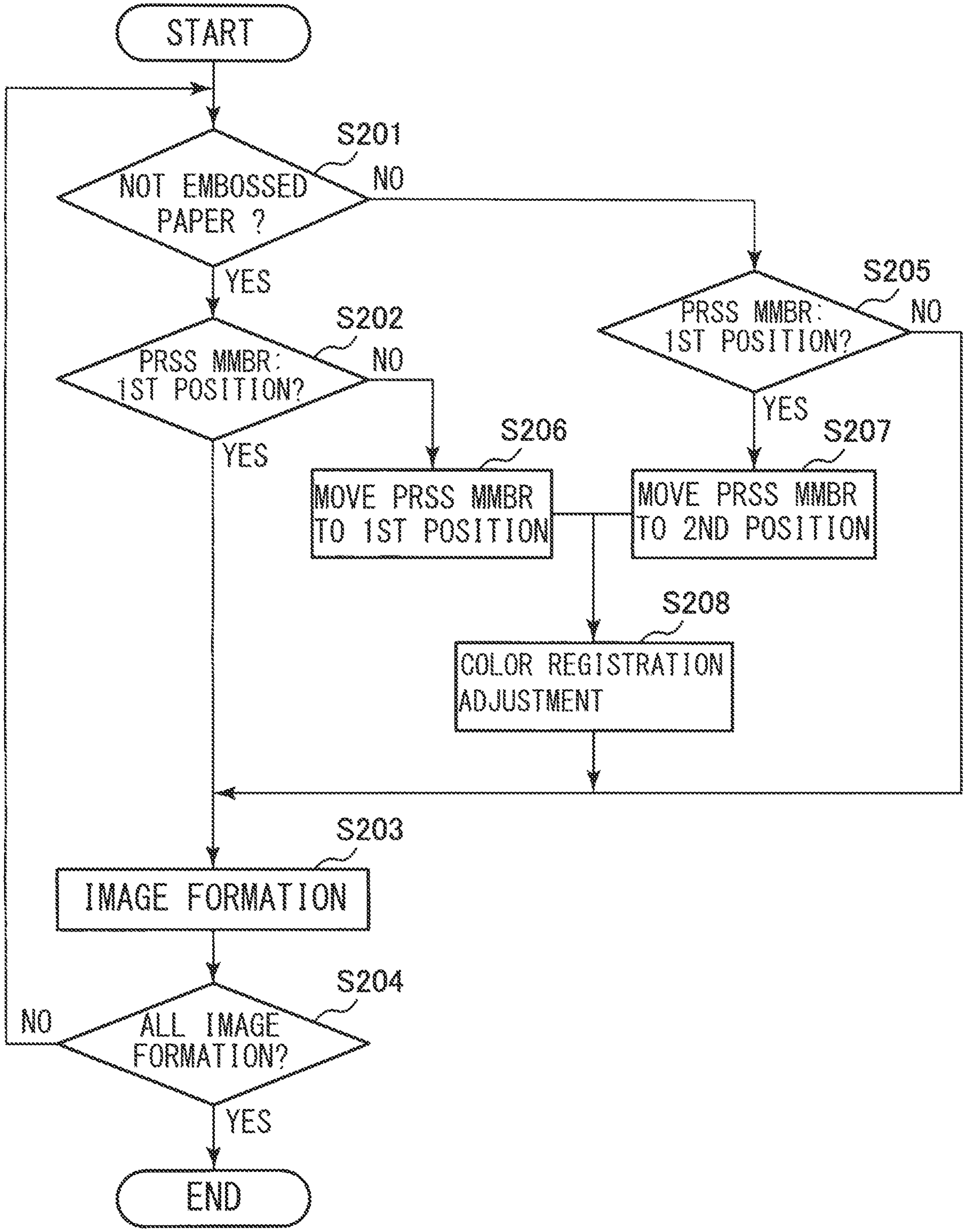

FIG. 15 is a flowchart of control in an embodiment 2.

Figure 16:
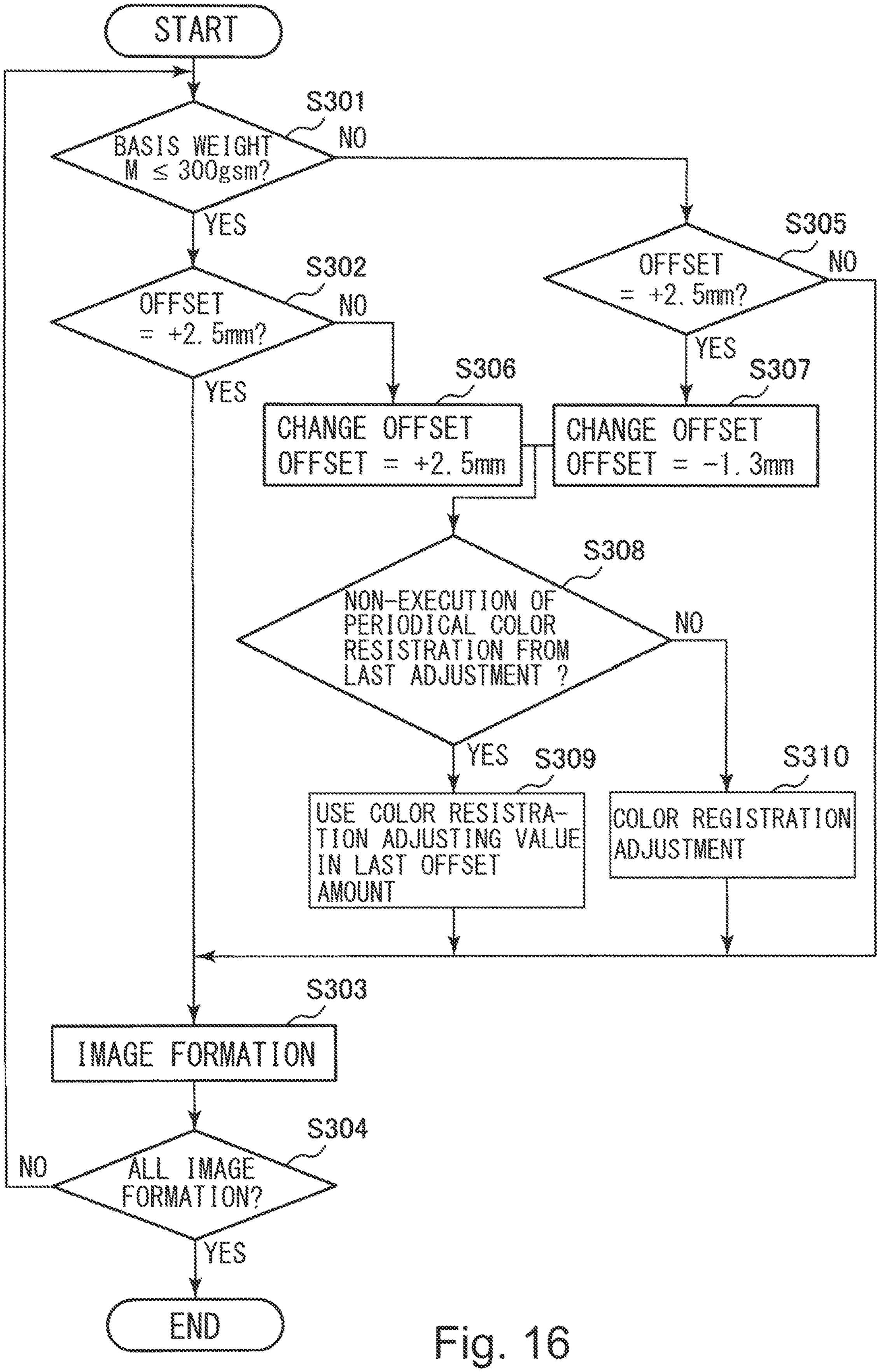

FIG. 16 is a flowchart of control in an embodiment 3.

Figure 17:
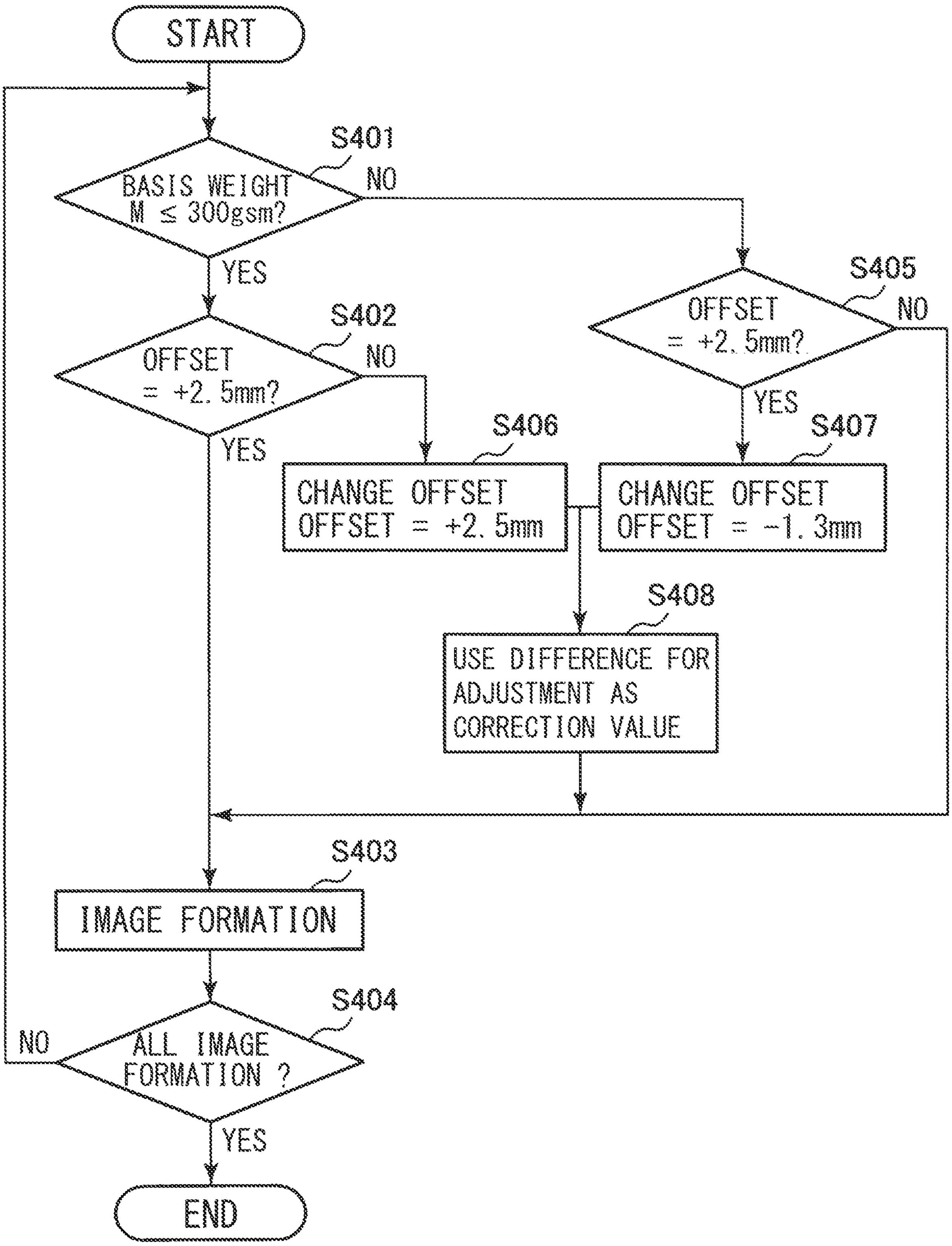

FIG. 17 is a flowchart of control in an embodiment 4.

DESCRIPTION OF THE EMBODIMENTS

In the following, an image forming apparatus according to the present invention will be described with reference to the drawings.

Embodiment 1

1. General Constitution and Operation of Image Forming Apparatus

Figure 1:
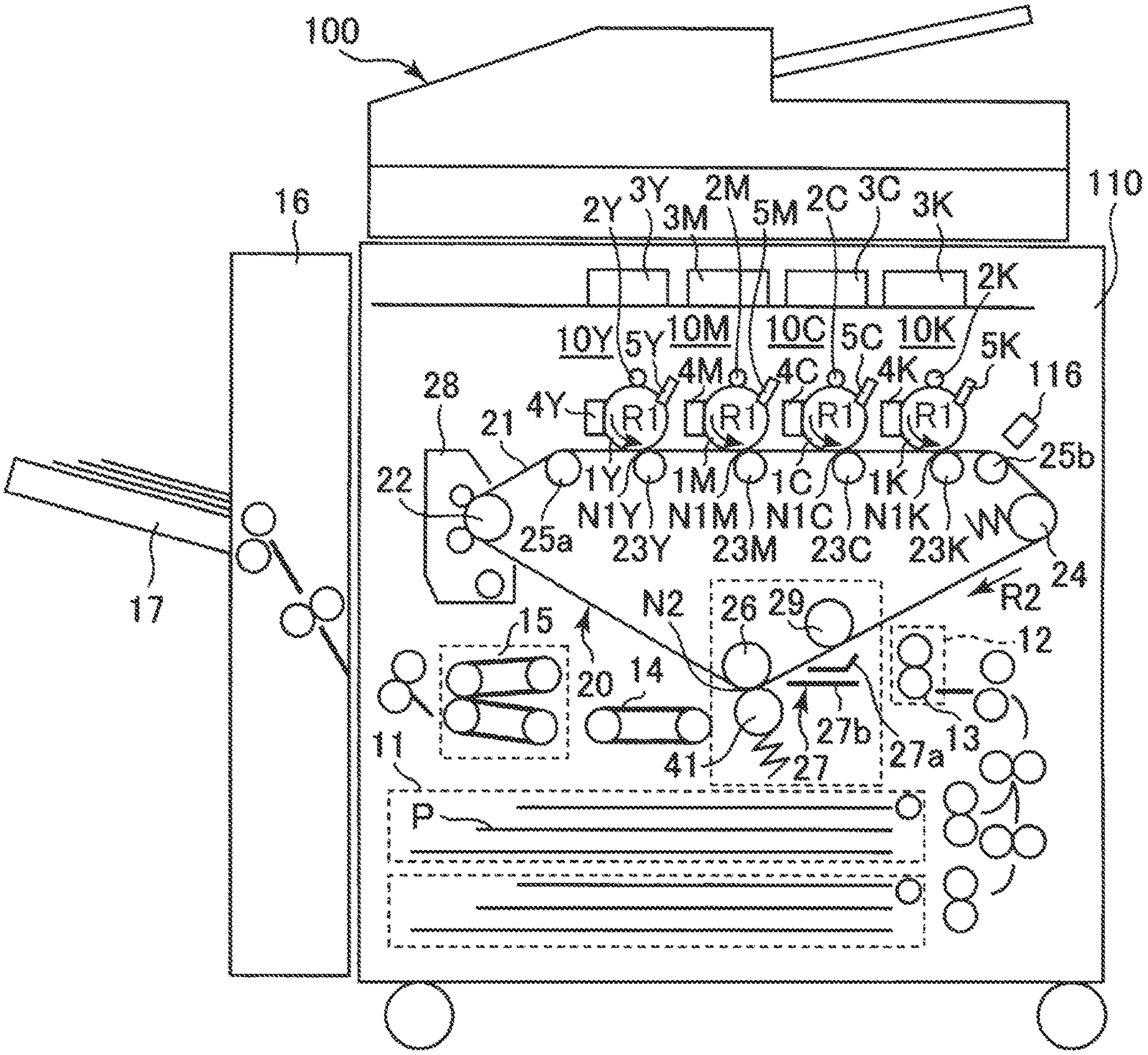
FIG. 1 is a schematic sectional view of an image forming apparatus.

FIG. 1 is a schematic sectional view of an image forming apparatus 100 of the present invention. The image forming apparatus 100 in this embodiment is a tandem multi-function machine (having functions of a copying machine, a printer and a facsimile machine) employing an intermediary transfer type system. For example, in accordance with an image signal sent from an external device such as a personal computer, the image forming apparatus 100 is capable of forming a full-color image on a sheet-like recording material (a sheet (paper), a transfer material, a sheet material, a recording medium, media) P such as paper by using an electrophotographic method.

The image forming apparatus 100 includes, as a plurality of image forming means portions (stations), four image forming portions 10Y, 10M, 10C and 10K for forming images of yellow (Y), magenta (M), cyan (C) and black (K). These image forming portions 10Y, 10M, 10C and 10K are disposed in line along a movement direction of an image transfer surface disposed substantially parallel to an intermediary transfer belt 21. As regards elements of the image forming portions 10Y, 10M, 10C and 10K having the same or corresponding functions or constitutions, suffixes Y, M, C and K for representing the elements for associated colors are omitted, and the elements will be collectively described in some instances. In this embodiment, the image forming portion 10 is constituted by including a photosensitive drum 1 (1Y, 1K, 1C, 1K), a charging roller 2 (2Y, 2M, 2C, 2K), an exposure device 3 (3Y, 3M, 3C, 3K), a developing device 4 (4Y, 4M, 4C, 4K), a primary transfer roller 23 (23Y, 23M, 23C, 23K), a cleaning device 5 (5Y, 5M, 5C, 5K) and the like, which are described later.

The image forming portion 10 is provided with the photosensitive drum 1 which is a rotatable drum-shaped (cylindrical) photosensitive member (electrophotographic photosensitive member) as a first image bearing member for bearing a toner image. To the photosensitive drum 1, a driving force is transmitted from a drum driving portion 111 (FIG. 2) as a driving means including a driving motor 111*a* as a driving source, so that the photosensitive drum 1 is rotationally driven in an arrow R1 direction (counterclockwise direction) in FIG. 1.

A surface of the rotating photosensitive drum 1 is electrically charged uniformly to a predetermined polarity (negative in this embodiment) and a predetermined potential by the charging roller 2 which is a roller-shaped charging member as a charging means (charger). During a charging process, to the charging device 2, a predetermined charging voltage is applied from a charging voltage source (not shown). The charged surface of the photosensitive drum 1 is subjected to scanning exposure to light depending on an image signal by the exposure device 3 as an exposure means (electrostatic image forming means), so that an electrostatic image (electrostatic latent image) is formed on the photosensitive drum 1. In this embodiment, the exposure device 3 is constituted by a laser scanner device for irradiating the surface of the photosensitive drum 1 with laser light modulated depending on an image signal. The electrostatic image formed on the photosensitive drum 1 is developed (visualized) by supplying toner as a developer by the developing device 4 as a developing means, so that a toner image (developer image) is formed on the photosensitive drum 1. In this embodiment, the toner charged to the same polarity (negative polarity in this embodiment) as a charge polarity of the photosensitive drum 1 is deposited on an exposed portion (image portion) of the photosensitive drum 1 where an absolute value of the potential is lowered by exposing to light the surface of the photosensitive drum 1 after the photosensitive drum 1 is uniformly charged (reverse development type). In this embodiment, a normal charge polarity of the toner which is a principal charge polarity of the toner during the development is the negative polarity. The developing device 4 includes a developing roller (not shown), which is a rotatable developer carrying member, for feeding the developer to a developing position which is an opposing portion to the photosensitive drum 1 while carrying the developer. The developing roller is rotationally driven by transmitting thereto a driving force from a driving system for the photosensitive drum 1, for example. Further, during development, to the developing roller, a predetermined developing voltage is applied from a developing voltage source (not shown).

As a second image bearing member for bearing the toner image, the intermediary transfer belt 21 which is a rotatable intermediary transfer member constituted by an endless belt is provided so as to oppose the four photosensitive drums 1Y, 1M, 1C and 1K. The intermediary transfer belt 21 is extended around and stretched by a plurality of stretching (supporting) rollers including a driving roller 22, an upstream auxiliary roller 25*a*, a downstream auxiliary roller 25*b*, a tension roller 24, a pre-secondary transfer roller 29 and an inner roller 26. The driving roller 22 transmits a driving force to the intermediary transfer belt 21. The tension roller 24 is provided downstream of a primary transfer portion N1 (described later) and upstream of a secondary transfer portion N2 (described later) with respect to a rotational direction (feeding direction, movement direction, travelling direction) of the intermediary transfer belt 21 and imparts predetermined tension to the intermediary transfer belt 21. The pre-secondary transfer roller 29 forms a surface of the intermediary transfer belt 21 in the neighborhood of the secondary transfer portion N2 on a side unit of the secondary transfer portion N2 with respect to the rotational direction of the intermediary transfer belt 21. The inner roller (inner secondary transfer roller, inner member, secondary transfer opposite roller) 26 functions as an opposing member (opposite electrode) of an outer roller 41 (described later). The upstream auxiliary roller 25*a* and the downstream auxiliary roller 25*b* form the image transfer surface disposed substantially horizontally. The driving roller 22 is rotationally driven by transmission of the driving force thereto from a belt driving portion 113 (FIG. 2) as a driving means including a belt driving motor 113*a* as a driving source. By this, the driving force is inputted from the driving roller 22 to the intermediary transfer belt 21, so that the intermediary transfer belt 21 is rotated (circulated and moved) an arrow R2 direction (clockwise direction) in FIG. 1. On the inner peripheral surface side of the intermediary transfer belt 21, the primary transfer rollers 23Y, 23M, 23C and 23K which are roller-like primary transfer members as primary transfer means are disposed correspondingly to the respective photosensitive drums 1Y, 1M, 1C and 1K. The primary transfer roller 23 is urged toward an associated photosensitive drum 1 through the intermediary transfer belt 21, whereby the primary transfer portion (primary transfer nip) N1 which is a contact portion between the photosensitive drum 1 and the intermediary transfer belt 21 is formed. Of the plurality of stretching rollers, the stretching rollers other than the driving roller 22 and the primary transfer rollers 23 are rotated by rotation of the intermediary transfer belt 21. Incidentally, in this embodiment, the tension roller 24 has a function as a steering roller. That is, in this embodiment, the tension roller 24 not only imparts a predetermined tension to the intermediary transfer belt 21 but also corrects a shift (shift of a moving (travelling) position of the intermediary transfer belt 21 in a widthwise direction substantially perpendicular to a movement direction of a surface of the intermediary transfer belt 21).

The toner image formed on the photosensitive drum 1 as described above is primary-transferred onto the rotating intermediary transfer belt 21 at the primary portion N1 by the action of the primary transfer roller 23. During the primary transfer, to the primary transfer roller 23, a primary transfer voltage which is a DC voltage of an opposite polarity (positive polarity in this embodiment) to the normal charge polarity of the toner is applied by an unshown primary transfer voltage source. For example, during full-color image formation, the color toner images of yellow, magenta, cyan and black formed on the respective photosensitive drums 1 are successively primary-transferred superposedly onto the same image forming region of the intermediary transfer belt 21. In this embodiment, the primary transfer portion N1 is an image forming position Where the toner image is formed on the intermediary transfer belt 21. The intermediary transfer belt 21 is an example of an endless belt rotatable while feeding the toner image carried in the image forming position.

On an outer peripheral surface side of the intermediary transfer belt 21, at a position opposing the inner roller 26, an outer roller (outer secondary transfer roller, secondary transfer roller, outer member) 41 which is a roller-like secondary transfer member (rotatable transfer member) as a secondary transfer means is provided. The outer roller 41 is urged toward the inner roller 26 through the intermediary transfer belt 21 and forms the secondary transfer portion (secondary transfer nip) N2 as a secondary transfer portion which is a contact portion between the intermediary transfer belt 21 and the outer roller 41. The outer roller 41 is rotated with rotation of the intermediary transfer belt 21 but may also be rotationally driven separately from the intermediary transfer belt 21. The toner images formed on the intermediary transfer belt 21 as described above are secondary-transferred onto a recording material P sandwiched and fed by the intermediary transfer belt 21 and the outer roller 41 at the secondary transfer portion N2 by the action of the outer roller 41. In this embodiment, during the secondary transfer, to the outer roller 41, a secondary transfer voltage which is a DC voltage of the opposite polarity (positive polarity in this embodiment) to the normal charge polarity of the toner is applied by a secondary transfer voltage source (not shown). In this embodiment, the inner roller 26 is electrically grounded (connected to the ground). Incidentally, the inner roller 26 is used as a secondary transfer member and a secondary transfer voltage of the same polarity as the normal charge polarity of the toner is applied thereto, and the outer roller 41 is used as an opposite electrode and may also be electrically grounded.

The recording material P is fed to the secondary transfer portion N2 by being timed to the toner image on the intermediary transfer belt 21. The recording material P is accommodated in a recording material accommodating portion (cassette) 11 in advance. This recording material P is sent from the recording material accommodating portion 11 by a feeding portion such as a feeding roller provided in the recording material accommodating portion 11, and is fed toward the secondary transfer portion N2 by a registration adjusting portion 12 at predetermined timing (registration ON timing described later) after being adjusted in attitude by the registration adjusting portion 12. Here, the registration adjusting portion 12 includes a pair of registration rollers (registration roller pair) 13 which is a roller-shaped feeding member as a feeding means and a registration roller driving portion (feeding driving portion) 114 (FIG. 2) as a driving means for driving the registration rollers 13. The registration rollers 13 are rotationally driven by the registration roller driving portion 114, so that the recording material P is fed in a contact portion (nip) of the pair of registration rollers 13. Incidentally, the registration roller driving portion 114 includes a registration roller driving motor 114*a* (FIG. 2), and the registration roller driving portion 114 drives at least one (or may also be both) of the pair of registration rollers 13. In this embodiment, a controller (FIG. 2) is capable of executing change in feeding start timing (registration ON timing of the recording material P) by a registration ON timing changing means. Further, the controller 150 controls the number of rotations (turns) of the registration roller driving motor 114*a* of the registration roller driving portion 114 and thus controls the number of rotations of the registration rollers 130, so that the controller 150 may also be capable of changing a feeding speed of the recording material P in the secondary transfer portion N2. The recording material P fed from the recording material accommodating portion 11 is once stopped by the registration rollers 13. Then, this recording material P is sent into the secondary transfer portion N2 by rotationally driving the registration rollers 13 so that the toner image on the intermediary transfer belt 21 coincides with a desired image forming region on the recording material P in the secondary transfer portion N2.

With respect to the feeding direction of the recording material P, a feeding guide 27 for guiding the recording material P to the secondary transfer portion N2 is provided downstream of the registration rollers 13 and upstream of the secondary transfer portion N2. The feeding guide 27 is constituted by including a first guiding member 27*a* contactable to a front surface of the recording material P (i.e., a surface onto which the toner image is to be transferred immediately after the recording material P passes through the feeding guide 27 and a second guiding member 27*b* contactable to a back surface of the recording material P (i.e., a surface opposite from the front surface). The image guiding member 27*a* and the second guiding member 27*b* are disposed opposed to each other, and the recording material P passes through between these members. The first guiding member 27*a* restricts movement of the recording material P in a direction toward the intermediary transfer belt 21. The second guiding member 27*b* restricts movement of the recording material P in a direction away from the intermediary transfer belt 21.

The recording material P on which the toner images are transferred is fed by a feeding belt 14 toward a fixing device 15 as a fixing means. The feeding belt 14 is driven by a feeding (belt) driving motor (not shown). On the inner peripheral surface side of the feeding belt 14, a suction fan (not shown) for attracting the recording material P is provided and attracts the recording material P toward the feeding belt 14. The fixing device 15 heats and presses the recording material P carrying thereon unfixed toner images, and thus fixes (melts) the toner images on the surface of the recording material P. Thereafter, the recording material P on which the toner images are fixed is discharged (outputted) to a discharge tray 17 provided on an outside of an apparatus main assembly 110 of the image forming apparatus 100 by a discharging device 16.

On the other hand, toner (primary transfer residual toner) remaining on the photosensitive drum 1 after the primary transfer is removed and collected from the surface of the photosensitive drum 1 by a cleaning device 5 as a cleaning means. Further, deposited matters such as toner (secondary transfer residual toner) remaining on the intermediary transfer belt 21 after the secondary transfer, and paper powder guided from the recording material P are removed and collected from the surface of the intermediary transfer belt 21 by a belt cleaning device 28 as an intermediary member cleaning means.

Incidentally, in this embodiment, an intermediary transfer belt unit 20 as a belt feeding device is constituted by including the intermediary transfer belt 21 stretched by the plurality of stretching rollers, the respective primary transfer rollers 23, the belt cleaning device 28, a frame supporting these members, and the like. The intermediary transfer belt unit 20 is mountable to and dismountable from the apparatus main assembly 110 for maintenance and exchange.

2. Offset

Figure 3:
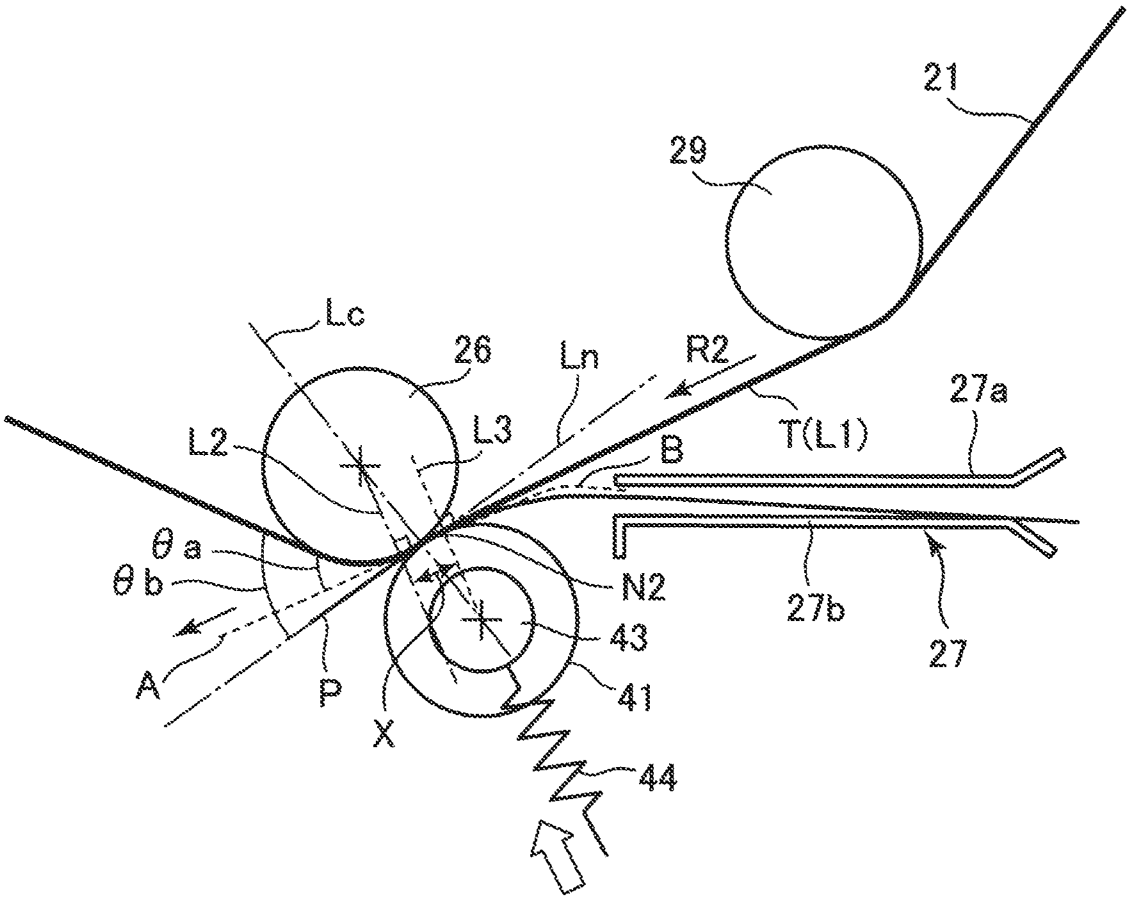
FIG. 3 is a schematic sectional view showing a secondary transfer portion.

FIG. 3 is a schematic sectional view (of a cross section substantially perpendicular to the rotational axis direction of the inner roller 26) for illustrating behavior of the recording material P in the neighborhood of the secondary transfer portion N2. Incidentally, in FIG. 3, elements having identical and corresponding functions and constitutions to those of the image forming apparatus 100 of this embodiment are represented by the same reference numerals or symbols. Further, in this embodiment, the outer roller 41 is rotatably supported by bearings 43 at opposite end portions thereof with respect to a rotational axis direction. The bearings 43 are slidable (movable) in a direction toward and away from the inner roller 26 and are pressed toward the inner roller 26 by urging spring 44 constituted by compression springs which are urging members (elastic members) as urging means. By this, the outer roller 41 contacts the intermediary transfer belt 21 toward the inner roller 26 at predetermined pressure and forms the secondary transfer portion N2. Further, in this embodiment, the outer roller 41 is rotated by the rotation of the intermediary transfer belt 21. Here, rotational axis directions of the stretching rollers including the inner roller 26 for the intermediary transfer belt 21 and the outer roller 41 are substantially parallel to each other.

As described above, depending on the rigidity of the shape (position) of the secondary transfer portion N2 and the rigidity of the recording material P, the behavior of the recording material P in the neighborhood of the secondary, transfer portion N2 on sides upstream and downstream of the secondary transfer portion N2 with respect to the feeding direction of the recording material P changes. For example, in the case where the recording material P is "thin paper" which is an example of paper small in rigidity, a jam (paper jam) occurs in some instances due to improper separation of the recording material P from the intermediary transfer belt 21. This phenomenon becomes conspicuous in the case where the rigidity of the recording material P is small since the recording material P is liable to stick to the intermediary transfer belt 21 due to weak resilience of the recording material P.

That is, in the cross section shown in FIG. 3, a line showing a stretching surface (tension surface) of the intermediary transfer belt 21 stretched and formed by the inner roller 26 and the pre-secondary transfer roller 29 is a pre-nip stretching line T. The pre-secondary transfer roller 29 in an example of the upstream rollers, of the plurality of stretching rollers, disposed adjacent to the inner roller 26 on a side upstream of the inner roller 26 with respect to the rotational direction of the intermediary transfer belt 21. Further, in the same cross section, a rectilinear line passing through a rotation center of the inner roller 26 and a rotation center of the outer roller 41 is a nip center line Lc. In the same cross section, a rectilinear line passing through the secondary transfer portion N2 and substantially perpendicular to the nip center line Lc is a nip line Ln. Incidentally, FIG. 3 shows a state in which with respect to a direction along the pre-nip stretching line T, the rotation center of the outer roller 41 is offset and disposed on a side upstream of the rotation center of the inner roller 26 with respect to the rotational direction of the intermediary transfer belt 21.

There is a tendency that the recording material P is liable to maintain an attitude substantially along the nip line Ln in a state in which the recording material P is nipped between the inner roller 26 and the outer roller 41 in the secondary transfer portion N2. For that reason, in general, in the case where the rotation center of the inner roller 26 and the rotation center of the outer roller 41 are close to each other with respect to the direction along the pre-nip stretching line T, as shown by a broken line A in FIG. 3, a discharge angle θa of the recording material P becomes small. That is, a leading end of the recording material P with respect to the feeding direction adopts an attitude such that the recording material P is discharged near to the intermediary transfer belt 21 when the recording material P is discharged near to the intermediary transfer belt 21 when the recording material P is discharged from the secondary transfer portion N2. By this, the recording material P is liable to stick to the intermediary transfer belt 21. On the other hand, in the case where the rotation center of the outer roller 41 is disposed on a side more upstream of the rotation center of the inner roller 26 with respect to the pre-nip rotation centering line T, as shown by a solid line in FIG. 3, the discharge angle θb of the recording material P becomes large. That is, the leading end of the recording material P with respect to the feeding direction adopts an attitude such that the recording material P is discharged in a direction away from the intermediary transfer belt 21 when the recording material P is discharged from the secondary transfer portion N2. By this, the recording material P does not readily stick to the intermediary transfer belt 21.

On the other hand, for example, in the case where the recording material P is "thick paper" which is an example of a recording material P large in rigidity, when a trailing end of the recording material P with respect to the feeding direction of the recording material P passes through the feeding guide 27, a trailing end portion of the recording material P with respect to the feeding direction collides with the intermediary transfer belt 21 in some instances. By this, an image defect occurs at the trailing end portion of the recording material P with respect to the feeding direction in some instances. This phenomenon becomes conspicuous in the case where the rigidity of the recording material P is large since due to storing resilience of the recording material P, the trailing end portion of the recording material P with respect to the feeding direction is liable to vigorously collide with the intermediary transfer belt 21.

That is, as described above, in the cross section shown in FIG. 3, in a state in which the recording material P is nipped between the inner roller 26 and the outer roller 41 in the secondary transfer portion N2, there is a tendency that the recording material P is liable to maintain the attitude thereof substantially along the nip line Ln. For that reason, in general, the nip line Ln approaches and contacts the pre-nip stretching line T as with respect to the direction along the pre-nip stretching line T, and the rotation center of the outer roller 41 is disposed on a side more upstream than the rotation center of the inner roller 26 in the rotational direction of the recording material P. As a result, when the trailing end of the recording material P with respect to the feeding direction passes through the feeding guide 27, as shown by a broken line B in FIG. 3, the trailing end portion of the recording material P with respect to the feeding direction collides with the intermediary transfer belt 21, so that the image defect is liable to occur at the trailing end portion of the recording material P with respect to the feeding direction. On the other hand, when the rotation center of the inner roller 26 and the rotation center of the outer roller 41 are brought near to each other with respect to the direction along the pre-nip stretching line T, collision of the recording material P with the intermediary transfer belt 21 when the trailing end of the recording material P with respect to the feeding direction passes through the feeding guide 27 is suppressed. By this, the image defect at the trailing end portion of the recording material P with respect to the feeding direction does not readily occur.

Accordingly, in order to realize improvement in separating property of the recording material P from the intermediary transfer belt 21 and suppression of the image defect at the trailing end portion of the recording material P with respect to the feeding direction, the following is effective. That is, depending on the kind of the recording material P, a relative position between the inner roller 26 and the outer roller 41 with respect to a circumferential direction of the inner roller 26 (the rotational direction of the intermediary transfer belt 21) is changed, so that the shape (position) of the secondary transfer portion N2 is changed.

With reference to FIG. 3, definition of an offset amount X indicating the relative position between the inner roller 26 and the outer roller 41 will be described. In the cross section shown in FIG. 3, a common tangential line of the inner roller 26 and the pre-secondary transfer roller 29 on a side Where the intermediary transfer belt 21 is extended around (contacted to) the stretching rollers is a reference line L1. The reference line L1 corresponds to the pre-nip stretching line T. Further, in the same cross section, a rectilinear line which passes through the rotation center of the inner roller 26 and which is substantially perpendicular to the reference line L1 is referred to as an inner roller center line L2. Further, in the same cross section, a rectilinear line which passes through the rotation center of the outer roller 41 and which is substantially perpendicular to the reference line L1 is referred to as an outer roller center line L3. At this time, a distance (vertical distance) between the inner roller center line L2 and the outer roller center line L3 is the offset amount X (in this case, the offset amount X is a positive value when L3 is on the side upstream of L2 with respect to the rotational direction of the intermediary transfer belt 21). The offset amount X can be a negative value, zero and the positive value. By making the offset amount X large, a width of the secondary transfer portion N2 with respect to the rotational direction of the intermediary transfer belt 21 extends toward an upstream side of the rotational direction of the intermediary transfer belt 21. That is, with respect to the rotational direction of the intermediary transfer belt 21, an upstream end portion of a contact region between the outer roller 41 and the intermediary transfer belt 21 is positioned further on an upstream side than an upstream end portion of a contact region between the inner roller 26 and the intermediary transfer belt 21 is. Thus, by changing a position of at least one of the inner roller 26 and the outer roller 41, the relative position between the inner roller 26 and the outer roller 41 with respect to the circumferential direction of the inner roller 26 is changed, so that the position (shape) of the secondary transfer N2 is changeable.

Here, in FIG. 3, the outer roller 41 is illustrated so as to virtually contact the reference line L1 (pre-nip stretching line T) without being deformed. However, a material of an outermost layer of the outer roller 41 is an elastic member such as a rubber or a sponge, so that in actuality, the outer roller 41 is pressed and deformed toward the inner roller 26 by the urging spring 44. When the outer roller 41 is offset and disposed toward the upstream side with respect to the rotational direction of the intermediary transfer belt 21 relative to the inner roller 26 and is pressed by the urging spring 44 so as to nip the intermediary transfer belt 21 between itself and the inner roller 26, the secondary transfer portion N2 in a substantially S shape is formed. Further, the attitude of the recording material P guided and sent to the feeding guide 27 is also determined in conformity to the shape of the secondary transfer portion N2. With an increasing offset amount X, a bending amount of the recording material P increases. For that reason, for example, in the case where the recording material P is the "thin paper", by making the offset amount X large, the separating property of the recording material P, from the intermediary transfer belt 21, passing through the secondary transfer portion N2 can be improved. However, when the offset amount X is large, the bending amount of the recording material P is large, so that in the case where for example, the recording material P is the "thick paper", when the trailing end of the recording material P with respect to the feeding direction passes through the feeding guide 27, the collision of the trailing end portion of the recording material P with respect to the feeding direction with the intermediary transfer belt 21 is liable to occur. This causes a lowering in image quality of the trailing end portion of the recording material P with respect to the feeding direction, but in this case, it may only be required that the offset amount X is made small.

In this embodiment, the image forming apparatus 100 changes the offset amount X including a first offset amount X1 and a second offset amount X2 by changing the position of at least one of the inner roller 26 or the outer roller 41. Particularly, in this embodiment, the image forming apparatus 100 changes the offset amount X on the basis of information on a basis weight of the recording material (paper) P as information on the kind of the recording material P relating to rigidity of the recording material P. For example, in the case where the recording material P is the "thick paper", the inner roller 26 is disposed in a second inner roller position where the offset amount X is the second offset amount X2. Further, in the case where the recording material P is the "thin paper", the inner roller 26 is disposed in a first inner roller position where the offset amount X is the first offset amount X1 larger than the second offset amount X2. The second offset amount X2 may be a positive value, zero and a negative value, and the first offset amount X1 is typically a positive value. In this embodiment, the relative position between the inner roller 26 and the outer roller 41 in the case where the offset amount X is the first offset amount X1 is a first relative position, and the relative position between the inner roller 26 and the outer roller 41 in the case where the offset amount X is the second offset amount X1 is a second relative position. That is, the position of the secondary transfer portion N2 in the case where the offset amount X is the first offset amount X1 is a first position of the transfer portion; and the position of the secondary transfer portion N2 in the case where the offset amount X is the second offset amount X2 to is a second position of the transfer portion.

3. Offset Mechanism

An offset mechanism 101 in this embodiment will be described. In this embodiment, the "thin paper" is used as an example of the recording material P small in rigidity, and the "thick paper" is used as an example of the recording material P large in rigidity.

Parts (a) and (b) of FIG. 4 are schematic side views (cross section substantially perpendicular to the rotational axis direction of the inner roller 26) of the neighborhood of the secondary transfer portion N2 in this embodiment as viewed substantially in parallel to the rotational axis direction on one end portion side (the front (surface) side in FIG. 1) with respect to the rotational axis direction of the inner roller 26. Here, part (a) of FIG. 4 shows a state of the case where a condition of the recording material P passing through the secondary transfer nip N2 is the "thin paper", and part (b) of FIG. 4 shows a state of the case where the condition is the "thick paper".

As shown in parts (a) and (b) of FIG. 4, the image forming apparatus 100 includes an offset mechanism (offset amount changing means) 101 as an offset amount changing mechanism for variably changing the offset amount X by changing a relative position of the inner roller 26 (relative) to the outer roller 41. In parts (a) and (b) of FIG. 4, a structure of the inner roller 26 at one end portion of the inner roller 26 with respect to the rotational axis direction is shown, but a structure of the inner roller 26 at the other end portion is also the same (i.e., these (opposite) end portions are substantially symmetrical to each other on the basis of a center of the inner roller 26 with respect to the rotational axis direction).

The opposite end portions of the inner roller 26 with respect to the rotational axis direction are rotatably supported by an inner roller holder 38 as a supporting member. The inner roller holder 38 is supported by a frame or the like of the intermediary transfer belt unit 20 so as to be rotatable about an inner roller rotation shaft 38*a*. Thus, the inner roller holder 38 is rotated about the inner roller rotation shaft 38*a*, so that the inner roller 26 is rotated about the inner roller rotation shaft 38*a*, so that the relative position of the inner roller 26 to the outer roller 41 is changed and thus the offset amount X can be changed.

Figure 2:
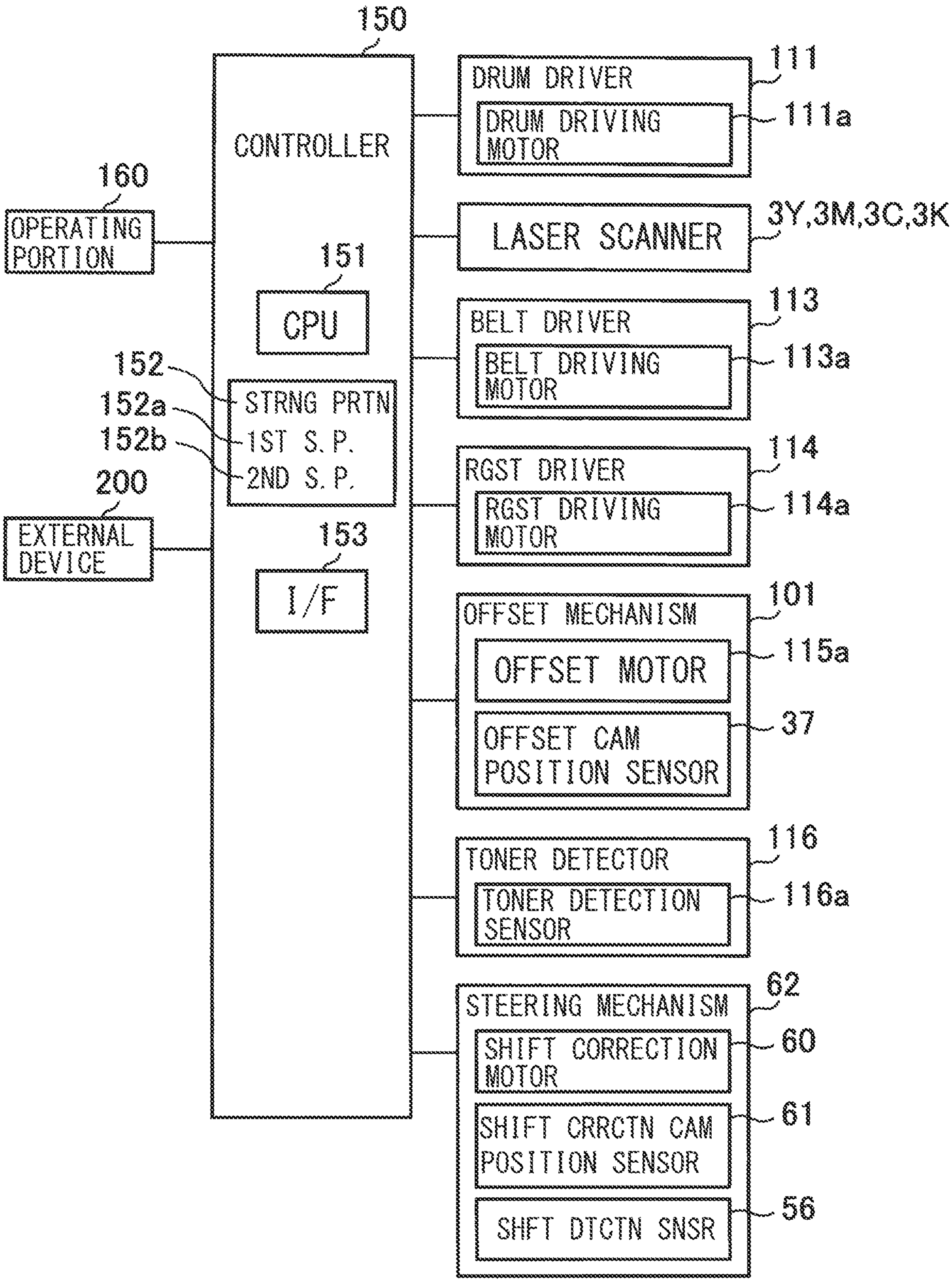
FIG. 2 is a schematic block diagram showing a control mode the image forming apparatus.

The inner roller holder 38 is constituted so as to be rotated by the action of an offset cam 39 as an acting member. The offset cam 39 is supported by the frame or the like of the intermediary transfer belt unit 20 so as to be rotatable about the offset cam rotation shaft 39*a*. The offset cam 39 is rotatable about the offset cam rotation shaft 39*a* by receiving the driving force (drive) from an offset motor (offset cam driving motor) 115 as a driving source. Further, the offset cam 39 contacts an offset cam follower (arm portion) 38*c* provided as a part of the inner roller holder 38. Further, as described later, the inner roller holder 38 is urged by tension of the intermediary transfer belt 21 such that the offset can follower 38*c* rotates in a direction in which the offset cam follower 38*c* contacts the offset cam 39. However, the present invention is not limited thereto, but the inner roller holder 38 may also be urged by a spring or the like which is an urging member (elastic member) as an urging means, so that the offset cam follower 38*c* rotates in a direction in which the offset cam follower 38*c* contacts the offset cam 39. Further, in this embodiment, the image forming apparatus 100 is provided with an offset cam position sensor 37, for detecting the position of the offset cam 39 with respect to the rotational direction, as a position detecting means for detecting the relative position between the inner roller 26 and the outer roller 41 (i.e., the position of the inner roller 26 in this embodiment). The offset cam position sensor 37 can be constituted by, for example, a flag provided on or coaxially with the offset cam 39 and an optical sensor (photo-interrupter) or the like as a detecting portion. The offset cam position sensor 37 may be constituted, for example, so as to detect a home position (HP) of the offset cam 39, i.e., a home position of the inner roller 26. A signal indicating a detection result of the offset cam position sensor 37 is inputted to the controller 150 (FIG. 2). On the basis of the detection result of the offset cam position sensor 37, the controller 150 can grasp the position (with respect to the rotational direction) of the offset cam 39, i.e., the position of the inner roller 26.

As described above, in this embodiment, the offset mechanism 101 is constituted by including the inner roller holder 38, the offset cam 39, the offset motor 115, the offset cam position sensor 37 and the like.

As shown in part (a) of FIG. 4, in the case of the "thin paper", the offset cam 39 is rotated, for example, counterclockwise by being driven by the offset motor 115. By this, the inner roller holder 38 is rotated clockwise about the inner roller rotation shaft 38*a*, so that the relative position of the inner roller 26 to the outer roller 41 is determined. By this, the inner roller 26 is disposed in a state in Which the inner roller 26 is in the second inner roller position where the offset amount X is the first offset amount X1 which is relatively large. In this state, the recording material P is liable to bend in the secondary transfer portion N2, and therefore, as described above, the separating property of the "thin paper" from the intermediary transfer belt 21 after passing through the secondary transfer portion N2 is improved.

As shown in part (b) of FIG. 4, in the case of the "thick paper", the offset cam 39 is rotated, for example, clockwise by being driven by the offset motor 115. By this, the inner roller holder 38 is rotated counterclockwise about the inner roller rotation shaft 38*a*, so that the relative position of the inner roller 26 to the outer roller 41 is determined. By this, the inner roller 26 is disposed in a state in which the inner roller 26 is in the first inner roller position where the offset amount X is the second offset amount X2 which is relatively small. In this state, a degree of bending of the recording material P in the secondary transfer portion N2 can be reduced, and therefore, as described above, it is possible to suppress a lowering in image quality at the trailing end portion of the "thick paper" with respect to the feeding direction.

In this embodiment, on the basis of a basis weight M (gsm) of the recording material P, the offset amounts X (X1, X2) are set at, for example, the following two patterns. Here, "gsm" means $g/m^2$.

(a) M≤300 gsm: X1=+2.5 mm (b) M>300 gsm: X2=−1.3 mm

In this embodiment, the position (the relative position between the inner roller 26 and the outer roller 41) of the inner roller 26 in the above setting (a) shown in part (a) of FIG. 4 is a home position of the inner roller 26 (the relative position between the inner roller 26 and the outer roller 41). Here, the home position of the inner roller 26 refers to a position when the image forming apparatus 100 is in a sleep state (described later) or when a main switch (main power source) is turned off. However, the present invention is not limited thereto, but the position of the inner roller 26 in the above setting (b) shown in part (b) of FIG. 4 may also similarly be the home position.

Further, the offset amount X and the kind (the basis weight of the recording material P in this embodiment) of the recording material P assigned to the offset amount X are not limited to the above-described specific examples. These values can be appropriately set through an experiment or the like from view points such as the improvement in separating property of the recording material P from the intermediary transfer belt 21 and the suppression of the image defect occurring in the neighborhood of the secondary transfer portion N2. In this embodiment, the offset amount X may suitably be about −3 mm to about +3 mm. The patterns of the offset amount X are not limited to the two patterns, but may also be set at three or more patterns. Further, in conformity with this embodiment, a proper setting can be selected from the settings of the three or more patterns on the basis of the information or the like on the basis weight of the recording material P as the information on the kind of the recording material P relating to the rigidity of the recording material P.

As described above, in the cross sections shown in parts (a) and (b) of FIG. 4, to the inner roller holder 38, counterclockwise moment about the inner roller rotation shaft 38*a* is always exerted by the tension of the intermediary transfer belt 21. That is, in this embodiment, by the tension of the intermediary transfer belt 21, moment in a direction in which the offset cam follower 38*c* rotates so as to engage with the offset cam 39 is always exerted on the inner roller holder 38. Further, in the cross-section shown in parts (a) and (b) of FIG. 4, the inner roller rotation shaft 38*a* is disposed on a side downstream, with respect to the feeding direction of the recording material P, of the rectilinear line (nip center line) Lc connecting the rotation center of the inner roller 26 and the rotation center of the outer roller 41. By this, in the case where the outer roller 41 is contacted to the intermediary transfer belt 21 toward the inner roller 26, reaction force received by the inner roller holder 38 from the outer roller 41 also constitutes the counterclockwise moment in parts (a) and (b) of FIG. 4. By such a constitution, the cam mechanism can be constituted without separately using an urging member such as a spring.

Further, in order to exchange the intermediary transfer belt 21, the inner roller holder 38 may desirably be disposed inside the stretching surface of the intermediary transfer belt 21 so as not to impair operativity of an operation in which the intermediary transfer belt 21 is mounted in or dismounted from the intermediary transfer belt unit 20. For that reason, in the cross section shown in parts (a) and (b) of FIG. 4, the inner roller rotation shaft 38*a* may desirably be disposed in a region A between the above-described rectilinear line (nip center line) Lc and a post-nip stretching line U. Here, the post-nip stretching line U is a line indicating the stretching surface of the intermediary transfer belt 21 stretched and formed by the inner roller 26 and the driving roller 22 (FIG. 1) in the cross section shown in parts (a) and (b) of FIG. 4. Incidentally, the driving roller 22 is an example of the downstream rollers, of the plurality of stretching rollers, disposed downstream of and adjacent to the inner roller 26 with respect to the rotational direction of the intermediary transfer belt 21.

4. Change in Offset Amount and Color Misregistration

Next, color misregistration with a change in offset amount will be described.

(Shift Control of Intermediary Transfer Belt)

First, shift control of the intermediary transfer belt 21 will be described.

The intermediary transfer belt 21 causes a shift thereof by imbalance in position (alignment) and pressing force of the stretching rollers, or the like. The shift of the intermediary transfer belt 21 can be controlled by changing a travelling direction of the intermediary transfer belt 21 in a manner such that at least one of the plurality of stretching rollers is used as a steering roller (shift control roller) and a rotation axis thereof is tilted so as to be inclined relative to rotational axes of other stretching rollers.

In this embodiment, the image forming apparatus 100 includes a steering mechanism as a shift control means for controlling the shift of the intermediary transfer belt 21. In this embodiment, the steering mechanism uses a signal of a sensor provided at an end portion of the intermediary transfer belt 21 with respect to the widthwise direction and carries out control of the shift by changing the alignment of the tension roller (also functioning as the steering roller) 24 so that a value of the signal of the sensor becomes constant. In the following, description will be made further specifically.

FIG. 5 is a schematic perspective view for illustrating a steering mechanism 62 in this embodiment.

As described above, in this embodiment, the tension roller 24 also functions as the steering roller. In this embodiment, the tension roller 24 is provided downstream of the primary transfer nip (portion) N1 (most downstream primary transfer nip (portion) N1K) and upstream of the secondary transfer portion N2 with respect to the rotational direction of the intermediary transfer belt 21. The tension roller 24 is rotatably held by the intermediary transfer belt unit 20 via bearing members (not shown) at opposite end portions thereof with respect to the rotational axis direction thereof. The bearing members at the opposite end portions of the tension roller 24 with respect to the rotational axis direction are supported slidably (movably) in a direction from an inner peripheral surface side toward an outer peripheral surface side of the intermediary transfer belt 21 or in an opposite direction thereof. Further, the bearing members at the opposite end portions of the tension roller 24 are pressed (urged) in the direction from the inner peripheral surface side toward the outer peripheral surface side of the intermediary transfer belt 21 by an urging force of compression springs or the like which are urging members (elastic members) as urging means, respectively. By this, the tension roller 24 imparts a predetermined tension to the intermediary transfer belt 21. Further, the bearing member at one end portion (on a rear side of the drawing sheet of FIG. 5) for the tension roller 24 with respect to the rotational axis direction is supported by the frame of the intermediary transfer belt unit 20 so as to be rotatable about the rotational axis substantially perpendicular to the rotational axis direction of the tension roller 24. Further, the bearing member at the other end portion (on a front side of the drawing sheet of FIG. 5) for the tension roller 24 is supported by the frame of the intermediary transfer belt unit 20 via a shift correcting arm 57. This shift correcting arm 57 is rotatable (swingable) around a rotation shaft substantially parallel to the rotational axis direction of the tension roller 24. By this, the tension roller 24 can be made rotatable so as to be moved in an up-down direction at an end portion on the front side in FIG. 5.

Thus, by rotating the tension roller 24, the tension roller 24 can be tilted so that the rotational axis of the tension roller 24 is tilted relative to the rotational axes of the other stretching rollers such as the driving roller 22.

When the intermediary transfer belt 21 is shifted toward the front side or the rear side of FIG. 5, by an associated end portion of the intermediary transfer belt 21 with respect to the widthwise direction, a shift detecting sensor 56 is moved in an arrow IF direction or an arrow IR direction in FIG. 5.

A signal indicating a detection result of the shift detecting sensor 56 is inputted to the controller 150 (FIG. 2). The controller 150 causes a shift correcting motor 60 as a driving source (steering driving portion) to drive depending on a travelling position (specifically, a position of the end portion of the intermediary transfer belt 21)with respect to the widthwise direction at a portion where the shift detecting sensor 56 contacts the intermediary transfer belt 21). When the shift correcting motor 60 is driven, a shift correcting cam 58 is rotated, so that the shift correcting arm 57 is swung. By this, the end portion of the tension roller 24 on the front side in FIG. 5 is moved upward and downward (in an arrow SF direction or in an arrow SR direction), so that the tension roller 24 is tilted.

Thus, the tension roller 24 is tilted, so that the intermediary transfer belt 21 is moved in the arrow IF direction or the arrow IR direction. By continuing these operations, the shift of the intermediary transfer belt 21 is corrected.

The position (position with respect to a tilting direction, inclination position) of the tension roller 24 is detected by a shift correcting cam position sensor 61 as a position information acquiring portion provided coaxially with a rotation shaft of the shift correcting cam 58. The shift correcting cam position sensor 61 is constituted by including, for example, the shift correcting cam 58, a flag as an indicating portion provided coaxially with the shift correcting cam 58, an optical sensor (photo-interrupter), or the like. The shift correcting cam position sensor 61 may be constituted so as to detect a home position (HP) of the shift correcting cam 58, i.e., a home position of the tension roller 24. A signal indicating a detection result of the shift correcting cam position sensor 61 is inputted to the controller 150 (FIG. 2). The controller 150 is capable of grasping a position (position with respect to the rotational direction) of the shift correcting cam 61, i.e., the position (inclination position) of the tension roller 24 on the basis of the detection result of the shift correcting cam position sensor 61. Further, the shift detecting sensor 56 is constituted by including, for example, a flag contacting the end portion of the intermediary transfer belt 21 with respect to the widthwise direction, an LED as a light emitting portion, and two photo-diodes as a light receiving portion. Depending on the position of the flag of the shift detecting sensor 56, a light receiving amount of the two photodiodes is changed. By pressing this light receiving amount, the travelling position of the intermediary transfer belt 21 with respect to the widthwise direction (specifically, the position of the end portion of the intermediary transfer belt 21 with respect to the widthwise direction at a portion where the shift detecting sensor 56 contacts the end portion of the intermediary transfer belt 21) can be grasped.

In this embodiment, the steering mechanism 62 is constituted by including the shift correcting motor 60, the shift correcting cam position sensor 61, the shift detecting sensor 56, the shift correcting arm 57, the shift correcting cam 58, and the like.

Incidentally, the constitution for controlling the shift of the intermediary transfer belt 21 is not limited to this embodiment, but for example, a known constitution can be appropriately used. For example, as regards the steering roller, a plurality of the rollers of the plurality of stretching rollers may be used as steering rollers. Further, the steering roller may be configured so that the opposite end portions thereof with respect to the rotational axis direction move, for example, about a central rotation axis with respect to the rotational axis direction. Further, there is a method which is called automatic alignment in which the shift is automatically controlled using a frictional force without using the sensor.

(Influence on Shift Control with Change in Offset Amount)

As described above, in this embodiment, a balance of a travelling attitude of the intermediary transfer belt 21 is maintained by changing the alignment of the tension roller 24. However, there is a need to re-adjust an adjusted balance position with a change in offset amount due to movement of the inner roller 26 stretching the intermediary transfer belt 21. This is because alignment between one end portion and the other end portion of the inner roller 26 with respect to the rotational axis direction of the inner roller 26 is changed by moving the inner roller 26 and thus an altitude such that the intermediary transfer belt 21 can be stably travelled is changed in some instances. As described above, in this embodiment, only the alignment of the tension roller 24 is adjusted by the shift control. For that reason, by the adjustment, the attitude of the intermediary transfer belt 21 is uniquely determined. Therefore, the readjustment of the position of the tension roller 24 means a change in attitude of the intermediary transfer belt 21.

FIG. 6 is a schematic view of the intermediary transfer belt 21 for illustrating the change in attitude of the intermediary transfer belt 21 as viewed from an image transfer surface side. A lower side of FIG. 6 is the front side of the drawing sheet of FIG. 1 (i.e., the front side of the image forming apparatus 100), and an upper side of FIG. 6 is the rear side of the drawing sheet of FIG. 1 (i.e., the rear side of the image forming apparatus 100). As shown in FIG. 6, the attitude of the intermediary transfer belt 21 changes from a state of (a) to a state of (b), for example. At this time, it is assumed that an image writing position (image writing timing) is adjusted by color registration adjustment (described later) so that color misregistration does not occur in the state of (a).

When the attitude of the intermediary transfer belt 21 is changed to the state of (b), a toner image Ty formed on the intermediary transfer belt 21 by an upstream image forming portion 10Y is moved to a position of Tyb when the toner image Ty reaches the primary transfer portion N1M of a downstream image forming portion 10M. For that reason, the position of Tyb is shifted on the rear side by A [μm] from the position of Tya adjusted by the color registration adjustment. This leads to color misregistration.

Incidentally, in FIG. 6, in order to simplify and show the change in attitude of the intermediary transfer belt 21, the intermediary transfer belt 21 is shown so that only an inclination thereof is changed from the state of (a) to the state of (b). However, specifically, until the travelling attitude of the intermediary transfer belt 21 is stabilized by changing the offset amount, a fluctuation in shift of the intermediary transfer belt 21 also occurs. That is, in this embodiment, the shift is corrected so that the position of the shift detecting sensor 56 indicated by a solid line in the state of (a) and the position of the shift detecting sensor 56 indicated by a broken line in the state of (b) become substantially constant. For that reason, in the case where the offset amount is changed, when the attitude of the intermediary transfer belt 21 is changed from the state of (a) to the state of (b), the intermediary transfer belt 21 is changed in travelling attitude (inclination) while causing a shift fluctuation. This shift is corrected by the above-described shift control, so that the end portion position of the intermediary transfer belt 21 detected by the shift detecting sensor 56 is stabilized so as to become a substantially certain position. However, depending on the change in alignment of the inner roller 26, the position of the tension roller 24 in this stable state is changed, so that the travelling attitude (inclination) of the intermediary transfer belt 21 is changed from the state of (a) to the state of (b).

5. Color Registration Adjustment

Next, the color registration adjustment as an adjusting operation will be described. In the image forming apparatus 100, in the case where images of different colors are transferred superposedly, when a relative position between the images of the respective colors is shifted, a resultant image formed on the recording material P causes a change in color (hue) or the like. For that reason, the image forming apparatus 100 causes the plurality of image forming portions to form a pattern image on the intermediary transfer belt 21 and executes the color registration adjustment (color misregistration correcting control) for correcting an image writing position (image writing timing) at each of the image forming portions on the basis of a result of detection of the pattern image by the sensor.

As shown in FIG. 1, the image forming apparatus 100 includes a toner detecting portion 116 provided with a toner pressing sensor 116*a* (FIG. 2) for detecting the pattern image (adjusting toner image, toner patch). The toner detecting portion 116 is provided between the primary transfer portion N1K of the most downstream image forming portion 10K and the secondary transfer portion N2. Particularly, in this embodiment, the toner detecting portion 116 is disposed in a position opposing the downstream auxiliary roller 25*b*.

FIG. 7 is a schematic view for illustrating a constitution of the toner detecting portion 116. The toner detecting sensor 116 is an optical sensor for detecting reflected light from the pattern image formed on the intermediary transfer belt 21. The toner detecting sensor 116 detects, for example, diffused reflection light from the pattern image. The toner detecting sensor 116*a* includes a light emitting portion 601 for irradiating (projecting) the intermediary transfer belt 21 with light and a light receiving portion 602 for receiving light from the intermediary transfer belt 21 or the pattern image. The light receiving portion 602 is disposed in a position where an incident angle and a reflection angle do not equal to each other so that the diffused reflection light of the light emitted from the light emitting portion 601 to the intermediary transfer belt 21 can be received. The light receiving portion 602 is disposed in a position where the light specularly reflected from the pattern image is not received. The toner detecting sensor 116*a* outputs a signal of a level depending on intensity (received light quantity) of the limit received by the light receiving portion 602. The toner detecting sensor 116*a* includes a lens 603 for collecting reflected light from a detection area 604 of a region (area) 605 irradiated with the light from the light emitting portion 601. That is, the light receiving portion 602 selectively receives diffuse reflection light from the detection area 604.

FIG. 8 is a schematic view of an example of a pattern image 300 formed on the intermediary transfer belt 21.

The pattern image 300 includes magenta pattern images 302, yellow pattern images 301, cyan pattern images 303, and superposed pattern images 304 in which the magenta pattern image is exposed from a gap between black pattern images. Reflected light from the black pattern image is small, so that the superposed pattern image 304 is formed for detecting a position of the black pattern image. In the example shown in FIG. 8, the pattern image of a reference color is the magenta pattern image 302. Incidentally, the pattern image of the reference color may also be the pattern image of another color such as yellow. On the basis of a time in which each of the respective pattern images is detected by the toner detecting sensor 116*a*, the image writing position for each of the colors is corrected. As a specific method of the color registration adjustment, for example, a known method can be arbitrary used, so that although specific description will be omitted, for example, the method can be performed in the following manner.

The pattern image 300 of FIG. 8 includes a first pattern image group 300*a* in which the penetration amounts are inclined in a first direction with respect to a feeding (conveying) direction of the intermediary transfer belt 21, and includes a second pattern image group 300*b* in which the pattern images are inclined in a second direction with respect to the feeding direction of the intermediary transfer belt 21. Each of the first and second pattern image groups 300*a* and 300*b* includes the pattern image of the reference color and the pattern images of other colors. This pattern image 300 is formed and conveyed on the rotating intermediary transfer belt 21. Accordingly, for example, in each of the first pattern image group 300*a* and the second pattern image group 300*b*, a detection time of the pattern image of the reference color and the pattern image of an objective color are acquired. Further, for example, on the basis of an interval between these times, it is possible to detect a positional deviation of the pattern image of the objective color relative to the pattern image of the reference color with respect to the feeding direction (sub-scan direction) of the intermediary transfer belt 21. By this, a relative positional deviation for each color with respect to the sub-scan direction, i.e., color misregistration can be detected. Further, the pattern images of the first pattern image group 300*a* and the pattern images of the second pattern image group 300*b* are inclined in different directions. Accordingly, for example, detection times of the pattern images of the respective colors of the first pattern image group 300*a* and detection times of the pattern images of the respective colors of the second pattern image group 300*b* are acquired. Then, for example, on the basis of each of time intervals of these detection times, the positional deviation of the pattern image of the associated color with respect to the widthwise direction (main scan direction) until the pattern image moves to the detection area of the toner detecting sensor 116*a* can be detected. By this, relative positional deviation for each color with respect to the main scan direction, i.e., color misregistration can be detected.

The controller 150 (FIG. 2) calculates an adjusting value for at least one image forming portion 10 required to be corrected so as to reduce a degree of the color misregistration with respect to the above-described sub-scan direction and the main scan direction. Then, during subsequent image formation, by using this adjusting value, for at least one image forming portion 10 required to be corrected, an image writing position with respect to at least one of the sub-scan direction and the main scan direction is corrected. By this, relative positional deviation of images of respective colors when the images of different colors are transferred superposedly, i.e., the color misregistration is reduced. For example, as described above with reference to FIG. 6, in the case where the yellow image is deviated from the magenta image toward the rear side by A μm with respect to the main scan direction, an image writing position of the magenta image may only be required to be corrected so as to shift the magenta image toward the rear side by A μm. Specifically, in this embodiment, a writing position (writing timing) of the electrostatic image on the photosensitive drum 1 by the exposure device 3 in the image forming portion 10, i.e., a light irradiation position (light irradiation timing) for the photosensitive drum 1 by the exposure device 3 is corrected. An amount in which this image writing position (image writing timing) is shifted corresponds to the adjusting value. Incidentally, in this embodiment, the image writing position (image writing timing) with respect to at least the main scan direction may only be required to be corrected so as to correct the color misregistration with respect to at least the widthwise direction (main scan direction) of the intermediary transfer belt 21.

6. Control Mode

FIG. 2 is a schematic block diagram showing a control mode of the image forming apparatus 100 in this embodiment. The image forming apparatus 100 is provided with the controller 150 as a control means. The controller 150 is constituted by including a CPU 151 as a calculation control means which is a dominant element for performing processing, a storing portion (memories, storing media) 152 such as a ROM, a RAM, and a non-volatile memory, which are used as storing means, and an interface portion 153 and the like. In the RAM, which is rewritable memory, information inputted to the controller 150, detected information, a calculation result and the like are stored. In the ROM, a data table acquired in advance and the like are stored. The CPU 151 and the memories 152 are capable of transferring and reading the data therebetween. The interface portion 153 controls input and output (communication) of signals between the controller 150 and devices connected to the controller 150.

To the controller 150, respective portions (the image forming portions 10, the intermediary transfer belt 21, driving devices for the members relating to feeding of the recording material P, various voltage sources and the like) of the image forming apparatus 100 are connected. For example, to the controller 150, the drum driving portion 111, the laser scanner devices 3Y, 3N, 3C and 3K, the belt driving portion 113, the registration roller driving portion 114, and the like are connected. Further, to the controller 150, the offset mechanism 101, the steering mechanism 62, the toner detecting portion 116, and the like are connected. Further, to the controller 150, the operating portion (operating panel) 160 provided on the image forming apparatus 100 is connected. The operating portion 160 includes a display portion as a display means for displaying information by control of the controller 150 and an input portion as an input means for inputting information to the controller 150 through an operation by an operator such as a user or a service person. The operating portion 160 may be constituted by including a touch panel having functions of the display portion and the input portion. Further, to the controller 150, an image reading apparatus (not shown) provided in or connected to the image forming apparatus and an external device 200 such as a personal computer connected to the image forming apparatus 100 may also be connected.

The controller 150 causes the image forming apparatus 100 to form the image by controlling the respective portions of the image forming apparatus 100 on the basis of information on a job. The job information includes a start instruction (start signal) and information (instruction signal) on an image forming operation condition such as a kind of the recording material P, which are inputted from the operating portion 160 or the external device 200. Further, the job information includes image information (image signal) inputted from the image reading apparatus or the external device 200. Incidentally, information on the kind of the recording material (information on the recording material) encompasses arbitrary pieces of information capable of discriminating the recording material, inclusive of attributes (so-called paper kind categories) based on general features such as plain paper, quality paper, coated paper, embossed paper, thick paper, thin paper, and paper quality, numerals and numerical ranges such as a basis weight, a thickness and rigidity, and brands (including manufacturers, trade names, product numbers and the like). For each of the recording materials discriminated by the information on the recording material, the information can be regarded as constituting the kind of the recording material. Further, the information on the recording material may be included in information on a print mode designating an operation setting of the image forming apparatus 100 or may be replaced with the information on the print mode.

Here, the image forming apparatus 100 executes a job which is a series of operations and is started by a single start instruction, and in which the image is formed and outputted on a single recording material P or a plurality of recording materials P. The job includes an image forming step, a pre-rotation step, a sheet (paper) interval step in the case where the images are formed on the plurality of recording materials P, and a post-rotation step in general. The image forming step is a period in which formation of an electrostatic image for the image actually formed and outputted on the recording material P, formation of the toner image, primary transfer of the toner image and secondary transfer of the toner image are carried out in actuality, and during image formation (image forming period) refers to this period. Specifically, a timing during the image formation is different between positions where the respective steps of the formation of the electrostatic image, the formation of the toner image, the primary transfer of the toner image, and the secondary transfer of the toner image are performed. The pre-rotation step is performed in a period in which a preparatory operation, before the image forming step, from an input of the start instruction until the image is started to be actually formed, is performed. The sheet interval step (recording material interval step, image interval step) is a period corresponding to an interval between a recording material P and a subsequent recording material P when the images are continuously formed on a plurality of recording materials P (continuous image formation). The post-rotation step is a period in which a post-operation (preparatory operation) after the image forming step is performed. During non-image formation (non-image formation period) is a period other than the period of the image formation and includes the pre-rotation step, the sheet interval step, and the post-rotation step and further includes a pre-multi-rotation step which is a preparatory operation during turning-on of a main switch (voltage source) of the image forming apparatus 100 or during restoration from a sleep state. Further, during the non-image formation includes a power OFF state, the sleep state, a stand-by state, and a period from the stand-by state until the pre-rotation step or the pre-multi-rotation step is started. Incidentally, the sleep state is, for example, a state in which supply of electric power to the respective portions of the image forming apparatus 100, other than the controller 150 (or a part thereof), is stopped and electric power consumption is made smaller than electric power consumption in the stand-by state. In this embodiment, during the non-image formation, the image forming apparatus 100 executes an operation of changing the above-described offset amount.

7. Control Procedure

Next, an operation of the job in this embodiment will be described. FIG. 9 is a flowchart showing an outline of a procedure of the job in this embodiment. As described above, the color misregistration occurs in some instances by the change in attitude of the intermediary transfer belt 21 with the change in offset amount. For that reason, in this embodiment, the image forming apparatus 100 performs the color registration adjustment in the case where the change in offset amount is made. In this embodiment, description will be made by taking, as an example, a job (mixed job) in which a plurality of recording materials P different in basis weight are used. Incidentally, in this embodiment, as regards the inner roller 26 (relative position between the inner roller 26 and the outer roller 41), a state in which the offset amount X is +2.5 mm is the home position. Accordingly, for example, in the case where the job is started from the sleep state of the image forming apparatus 100, the operation of the job such as drive of the intermediary transfer belt 21 is started from a state in which the inner roller 26 is in the home position where the offset amount X is +2.5 mm.

When the start of the job is required, the controller 150 starts drive of the photosensitive drum 1, the intermediary transfer belt 21, and the like and discriminates, on the basis of information of the job, whether or not the basis weight of the recording material P on which the image is subsequently formed is 300 gsm or less (S101). In the case where the controller 150 discriminated in S101 that the basis weight is 300 gsm or less ("Yes"), the controller 150 discriminates whether or not a present offset amount X is +2.5 mm (S102). In the case where the controller 150 discriminated in S102 that the present offset amount X is +2.5 mm ("Yes"), image formation is carried out without changing the offset amount X (S103). Thereafter, the controller 150 discriminates whether or not all the images in the job are formed (S104). Then, in the case where the controller 150 discriminated in S104 that all the images in the job are formed ("Yes"), the operation of the job is ended, and in the case where the controller 150 discriminated in S104 that all the images in the job are not ended ("No"), the process returns to the process of S101.

Further, in the case where the controller 150 discriminated in S101 that the basis weight is larger than 300 gsm ("No"), the controller 150 discriminates whether or not the present offset amount X is +2.5 mm (S105). In the case where the controller 150 discriminated in S105 that the present offset amount X is +2.5 mm ("Yes"), the controller 150 performs the following operation. That is, in order to meet the recording material P larger than 300 gsm in basis weight, the controller 150 causes the offset mechanism 101 to move the inner roller 26, so that the offset amount X is changed to −1.3 mm (S107). Then, the controller 150 executes the color registration adjustment (S108) since the controller 150 thus changed the offset amount X. Here, the controller 150 starts the color registration adjustment (specifically, formation of a pattern image on the intermediary transfer belt 21) after waiting a lapse of a time from the change of the offset amount X (specifically, the change in position of the inner roller 26 is completed) until shift behavior of the intermediary transfer belt 21 is stabilized. Further, the color registration adjustment in this case is performed in the sheet interval step, but as desired, the period of the sheet interval step is prolonged from the period of the sheet interval step in the case where the color registration adjustment is not performed. Thereafter, the controller 150 causes the image forming apparatus 100 to carry out the image formation (S103). Subsequent operations are similar to those described above. On the other hand, in the case where the controller 150 discriminated in S105 that the present offset amount X is −1.3 mm ("No"), the controller 150 causes the image forming apparatus 100 to carry out the image formation without changing the offset amount X (S103). Subsequent operations are similar to those described above.

Further, in the case where the controller 150 discriminated in S102 that the present offset amount X is −1.3 mm ("No"), the controller 150 performs the following operation. That is, in order to meet the recording material P of 300 gsm or less in basis weight, the controller 150 causes the offset mechanism 101 to move the inner roller 26, and thus changes the offset amount X to +2.5 mm (S106). Then, the controller 150 executes the color registration adjustment since the controller 150 changed the offset amount X (S108). Subsequent operations are similar to those described above.

Thus, in this embodiment, when the change in offset amount X is made in the case where the image formation in the job is continued, the color registration adjustment is executed. On the other hand, in the case where the image formation in the job is continued, when the image is subsequently formed on the recording material of the same kind (in which the basis weight is larger than 300 gsm or is not more than 300 gsm) as the last recording material, the change in offset amount X is not made, and therefore, the image formation is carried out without performing the color registration adjustment.

As described above, in this embodiment, the image forming apparatus 100 includes the plurality of image forming portions 10 for forming the toner images, the rotatable endless belt 21 on which the toner images are formed by the image forming portions 10, the plurality of stretching rollers for stretching the belt 21 and including the inner roller 26, the outer member 41 disposed opposed to the inner roller 26 and for forming the transfer portion N2 where the toner images are transferred from the belt 21 onto the recording material P while being contacted to the outer peripheral surface of the belt 21, the position changing mechanism 101 capable of changing the relative position between the inner roller 26 and the outer member 41 with respect to the circumferential direction of the inner roller 26 by changing at least one of the positions of the inner roller 26 and the outer member 41, the toner detecting portion 116 for detecting the toner images for adjustment on the belt 21 by the plurality of image forming portions 10, and the controller 150 capable of executing the adjusting operation in which the toner images for adjustment are formed on the belt 21 by the plurality of image forming portions 10 and in which on the basis of the detection result of the toner images for adjustment by the toner image detecting portion 116, the adjusting value for adjusting the image writing position with respect to the widthwise direction of the belt 21 in at least one of the plurality of image forming portions 10 is acquired. The controller 150 is capable of carrying out control so as to execute the above-described adjusting operation in the case where the above-described relative position is changed by the position changing mechanism 101. In this embodiment, the controller 150 is capable of carrying out control so as to execute the above-described adjusting operation before the toner image transferred onto a subsequent recording material is formed in the case where during execution of the job for transferring the toner images on the plurality of recording materials P, the above-described relative position is changed by the position changing mechanism 101 after the toner image is transferred onto the preceding recording material P. Incidentally, although specifically described in an embodiment 3, in the case where a predetermined condition is satisfied in the case where during the execution of the job for transferring the toner images on the plurality of recording materials P, the above-described relative position is changed by the position changing mechanism 101 after the toner image is transferred onto the preceding recording material, the controller 150 is capable of executing the above-described adjusting operation before the toner image transferred onto the subsequent recording material P is formed. Further, in the case where the above-described predetermined condition is not satisfied, it is possible to form the toner image transferred onto the subsequent recording material P without executing the above-described adjusting operation.

8. Effect of this Embodiment

As described above, according to this embodiment, the color registration adjustment is performed with the changing operation of the offset amount, so that it is possible to suppress the color misregistration due to the change in attitude of the intermediary transfer belt 21. That is, in this embodiment, in the constitution in which the position (shape) of the secondary transfer portion N2 is changeable, the color misregistration with this change can be suppressed. By this, according to this embodiment, the color misregistration can be suppressed while meeting a variety of recording materials P different in rigidity and the like.

Incidentally, in this embodiment, the case where the offset amount can be changed to the two offset amounts was described, but also, in the case where the offset amount can be changed to three offset amounts, it is possible to obtain a similar effect by similarly performing the color registration adjustment after changing the offset amount to each of the respective offset amounts.

Embodiment 2

Next, another embodiment of the present invention will be described. In the image forming apparatus of this embodiment, elements having the same or corresponding functions or constitutions as those in the embodiment 1 are represented by the same reference numerals or symbols as those in the embodiment 1 and will be omitted from detailed description.

1. Outline of this Embodiment

In order to obtain a sufficient transfer property of the toner images onto the recording materials with surface unevenness such as the thick paper and the embossed paper, a constitution in which a pressing member for pressing an inner peripheral surface of the intermediary transfer belt is provided in the neighborhood of an upstream side of the secondary transfer portion has been known. The pressing member improves a transfer property by ensuring a close contact state between the recording material and the intermediary transfer belt at a portion of application of a strong electric field principally in the neighborhood of the secondary transfer portion. For that reason, pressure for bringing the intermediary transfer belt into close contact with the recording material by changing the shape (attitude) of the intermediary transfer belt in the neighborhood of the secondary transfer portion is needed. Contact or non-contact of this pressing member and the change in contact force of the pressing member have the influence of changing a stretching state of the intermediary transfer belt in some instances, with the result that the color misregistration occurs in some instances.

2. Constitution of Image Forming Apparatus

FIG. 10 is a schematic sectional view of an image forming apparatus 100 of this embodiment. The image forming apparatus 100 of this embodiment has a constitution similar to the constitution of the image forming apparatus 100 of the embodiment 1 shown in FIG. 1. However, in this embodiment, on an inner peripheral surface side of the intermediary transfer belt 21, a pressing member 70 is provided upstream of the inner roller 26 and downstream of the pre-secondary transfer roller 29 with respect to the rotational direction of the intermediary transfer belt 21. The pressing member 70 contacts the inner peripheral surface of the intermediary transfer belt 21, so that the pressing member 70 is capable of pressing the intermediary transfer belt 21 from the inner peripheral surface side toward an outer peripheral surface side. By this, the pressing member 70 is capable of protruding, from the inner peripheral surface side toward the outer peripheral surface side of the intermediary transfer belt 21, a stretching surface T (FIG. 14) of the intermediary transfer belt 21 formed between the inner roller 26 and the pre-secondary transfer roller 29. The pressing member 70 and a pressing mechanism 102 (FIG. 14) for changing a position of this pressing member 70 will be further described later specifically.

FIG. 11 is a schematic block diagram showing a control mode of the image forming apparatus 100 of this embodiment. The control mode of this embodiment shown in FIG. 11 is similar to the control mode of the embodiment 1 shown in FIG. 2. However, this embodiment is different from the embodiment 1 in that the pressing mechanism 102 (described later) is connected to the controller 150.

3. Penetration Amount

FIG. 12 is a schematic sectional view (cross section substantially perpendicular to the rotational axis direction of the inner roller 26) for illustrating a feeding attitude of the recording material P in the neighborhood of the secondary transfer portion (secondary transfer nip) N2. Incidentally, FIG. 12 shows a state in which with respect to a direction along the stretching line (surface) T, a rotation center of the inner roller 26 and a rotation center of the outer roller 41 are disposed substantially in the same position.

As described above, depending on the rigidity of the recording material P, an attitude of the recording material P fed from the feeding guide 27 to the secondary transfer portion N2 changes. Then, for example, in the case where the recording material P is "thick paper", in the neighborhood of an entrance of the secondary transfer portion N2, a gap G is liable to generate between the intermediary transfer belt 21 and the recording material P, so that "scattering" is liable to occur.

That is, in FIG. 12, in the neighborhood of the entrance of the secondary transfer portion N2 (in the neighborhood of an upstream side of the inner roller 26 with respect to the rotational direction of the intermediary transfer belt 21), a distance in which the intermediary transfer belt 21 and the recording material P are in contact with each other along the movement direction of the intermediary transfer belt 21 is defined as a contact distance D. Specifically, the contact distance D is a distance between a contact start position between the inner roller 26 and the intermediary transfer belt 21 and a contact start position between the recording material P and the intermediary transfer belt 21 with respect to the movement direction of the intermediary transfer belt 21. For example, in the case where the recording material P is "thick paper", the rigidity of the recording material P is large, and therefore, the recording material P is not readily bent, so that the contact distance becomes small. For that reason, the gap G generates between the intermediary transfer belt 21 and the recording material P and electric discharge occurs in the gap G by the influence of the transfer electric field, so that the toner image scatters to cause image defect ("scattering") in some instances.

As countermeasures against such a problem, it is effective to provide the pressing member 70 for pressing the intermediary transfer belt 21 in contact with the inner peripheral surface of the intermediary transfer belt 21 in the neighborhood of the entrance of the secondary transfer portion N2. By protruding the stretching surface 'T' of the intermediary transfer belt 21 toward the outside by the pressing member 70, the contact distance D is made large, so that the gap G between the intermediary transfer belt 21 and the recording material P in the neighborhood of the entrance of the secondary transfer portion N2 can be reduced. By this, the "scattering" can be suppressed.

A penetration amount (pressing amount) of the pressing member 70 into the intermediary transfer belt 21 will be described. The pressing adjustment of the pressing member 70 against the intermediary transfer belt 21 can be represented by the following penetration amount of the pressing member 70 into the intermediary transfer belt 21. This penetration amount is roughly an amount in which the pressing member 70 protrudes the intermediary transfer belt 21 toward the outside relative to the stretching surface T of the intermediary transfer belt 21 formed by the inner roller 26 or the outer roller 41, and the pre-secondary transfer roller 29. The pre-secondary transfer roller 29 is an example of an upstream roller disposed upstream of and adjacent to the inner roller 26 of the plurality of stretching rollers with respect to the rotational direction of the intermediary transfer belt 21. This definition of the penetration amount specifically changes depending on the offset amount X indicating the relative position between the inner roller 26 and the outer roller 41 with respect to the circumferential direction of the inner roller 26. The definition of the offset amount X is as described above in the embodiment 1.

Each of parts (a) and (b) of FIG. 13 is schematic sectional view (cross section substantially perpendicular to the rotational axis direction of the inner roller 26) in the neighborhood of the secondary transfer portion N2 for illustrating definition of a penetration amount Y of the pressing member 70 into the intermediary transfer belt 21. Incidentally, the definition of the penetration amount Y is different between the case where the offset amount X is a positive value and the case where the offset amount X is a negative value. This is because in general, whether the stretching surface T of the intermediary transfer belt 21 in a state in which the intermediary transfer belt 21 is not pressed by the pressing member 70 is formed by the inner roller 26 and the pre-secondary transfer roller 29 or by the outer roller 41 and the pre-secondary transfer roller 29 is changed depending on the offset amount X. Part (a) of FIG. 13 shows the case where the offset amount X is 0 or the negative value (particularly the negative value), and part (b) of FIG. 13 shows the case where the offset amount X is the positive value.

First, the case where the offset amount X is 0 or the negative value will be described. In the cross section shown in part (a) of FIG. 13, a common tangential line of the inner roller 26 and the pre-secondary transfer roller 29 on a side where the intermediary transfer belt 21 is wound and stretched is a reference line L1. The reference line L1 corresponds to the above-described stretching surface T of the intermediary transfer belt 21 in the case where the intermediary, transfer belt 21 is not protruded toward the outer peripheral surface side by the pressing member 70. Further, in the same cross section, a tangential line, of the intermediary transfer belt 21 contacting the outer peripheral surface of the intermediary transfer belt 21 in a region where the pressing member contacts the intermediary transfer belt 21, substantially parallel to the reference line L1 is a pressing portion tangential line L4. At this time, in the case where the offset amount X is 0 or the negative value, a distance (perpendicular distance) between the reference line L1, and the pressing portion tangential line L4 is defined as a penetration amount Y of the pressing member 70 into the intermediary transfer belt 21 (however, the penetration amount Y is the positive value when the pressing portion tangential line L4 is positioned further on the outer peripheral surface side of the intermediary transfer belt 21 than the reference line L1 is). This penetration amount Y can be 0 or the positive value.

Next, the case where the offset amount X is the positive value will be described. In the cross section shown in part (b) of FIG. 13, a common tangential line of the outer roller 41 and the pre-secondary transfer roller 29 on a side where the intermediary transfer belt 21 is wound and stretched is a reference line L1'. Further, in the same cross section, a tangential line, of the intermediary transfer belt 21 contacting the outer peripheral surface of the intermediary transfer belt 21 in a region where the pressing member contacts the intermediary transfer belt 21, substantially parallel to the reference line L1' is a pressing portion tangential line L4'. At this time, in the case where the offset amount X is the positive value, a distance (perpendicular distance) between the reference line L1' and the pressing portion tangential line LA' is defined as a penetration amount V of the pressing member 70 into the intermediary transfer belt 21 (however, the penetration amount Y is the positive value when the pressing portion tangential line L4' is positioned further on the outer peripheral surface side of the intermediary transfer belt 21 than the reference line L1' is). This penetration amount Y can be 0 or the positive value.

4. Pressing Member, Pressing Mechanism

Next, the pressing member 70 in this embodiment and the pressing mechanism 102 for changing a position of the pressing member 70 will be described. Each of parts (a) and (b) of FIG. 14 is a schematic (sectional) side view of a principal part in the neighborhood of the secondary transfer portion N2 in this embodiment as viewed substantially in parallel to the rotational axis direction of the inner roller 26 from one end portion side (the front side of the drawing sheet of FIG. 10) with respect to the rotational axis direction of the inner roller 26. Part (a) of FIG. 14 shows a state in which the pressing member 70 presses the intermediary transfer belt 21 with a predetermined pressing force, and part (b) of FIG. 14 shows a state in which the pressing member 70 is separated from the intermediary transfer belt 21. In parts (a) and (b) of FIG. 14, a constitution of one end portion with respect to the rotational axis direction of the inner roller 26 is shown, but a constitution of the other end portion is similar to the constitution of one end portion (these end portions are substantially symmetrical with respect to a center of the inner roller 26 with respect to the rotational axis direction).

In this embodiment, the image forming apparatus 100 includes a sheet-like pressing member (back-up sheet) 70. The pressing member 70 is capable of protruding the intermediary transfer belt 21 toward the outer peripheral surface side by pressing the inner peripheral surface of the intermediary transfer belt 21 in the neighborhood of the entrance of the secondary transfer portion N2. The pressing member 70 is disposed so as to be contactable to the inner peripheral surface of the intermediary transfer belt 21 on a side upstream of the inner roller 26 and downstream of the pre-secondary transfer roller 29 with respect to the rotational direction of the intermediary transfer belt 21. Particularly, in this embodiment, with respect to the feeding direction of the recording material P, the pressing member 70 is disposed so as to be contactable to the inner peripheral surface of the intermediary transfer belt 21 corresponding to a position upstream of the inner roller 26 and downstream of a free end of the feeding guide 27 (first guiding member 27*a*) on a downstream side.

The pressing member 70 can be formed using a resin material. As the resin material for forming the pressing member 70, for example, polyester resin or the like such as PET resin can be suitably used. In this embodiment, the pressing member 70 is constituted by a plate-like member Which has a predetermined length with respect to each of a longitudinal direction substantially parallel to a widthwise direction (direction substantially perpendicular to a surface movement direction) of the intermediary transfer belt 21 and a short (-side) direction substantially perpendicular to the longitudinal direction and which has a predetermined thickness. The length of the pressing member 70 with respect to the longitudinal direction is equal to the length of the intermediary transfer belt 21 with respect to the widthwise direction. Further, the pressing member 70 includes a free end portion which is one end portion (an end portion on a downstream side with respect to the rotational direction of the intermediary transfer belt 21) with respect to the short direction thereof, and the free end portion is contactable to the inner peripheral surface of the intermediary transfer belt 21 over a substantially full width of the intermediary transfer belt 21 and is capable of pressing the intermediary transfer belt 21. Further, as an example, the thickness of the pressing member 70 is about 0.4-0.6 mm. In this embodiment, the pressing member 70 is an elastic member, and is disposed so as to follow the intermediary transfer belt 21 by elastic deformation thereof.

Here, as the pressing member 70, for example, a PET resin sheet adjusted to have a medium electric resistance (for example, volume resistivity of $1\times10^5$-$1\times10^9$ Ω·cm) can be used.

By this, it is possible to suppress that the current flows through the pressing member 70 and that rotation of the intermediary transfer belt 21 is prevented by attraction of the intermediary transfer belt 21 to the pressing member 70 due to static electricity (triboelectric charge) caused by friction between the pressing member 70 and the intermediary transfer belt 21.

Incidentally, the pressing member 70 is not limited to the sheet-like member made of the resin material. The pressing member 70 may be a sheet-like member constituted by a thin plate made of metal. Further, the pressing member 70 is not limited to the sheet-like member. The pressing member 70 may be, for example, an elastic member (such as a pad-like member) such as a sponge or a rubber. Further, the pressing member 70 may be, for example, a rigid member such as a rotatable roller made of the resin material or the metal. Further, the pressing member 70 is not limited to the pressing member 70 disposed in the predetermined position and contacted to the intermediary transfer belt 21 as in this embodiment. For example, in the case where the rigid member such as the above-described rotatable roller is used as the pressing member 70, the pressing member 70 may be urged toward the intermediary transfer belt 21 by a spring or the like as an urging means.

Further, in this embodiment, the image forming apparatus 100 includes the pressing mechanism (pressing amount changing means) 102 as the position changing mechanism. The pressing mechanism 102 changes the position of the pressing member 70 and thus changes at least one of the penetration amount (pressing adjustment) of the pressing member 70 into the intermediary transfer belt 21 and the contact or separation state of the pressing member 70 relative to the intermediary transfer belt 21. Incidentally, in this embodiment, for simplification, description will be made in some instances as that the above-described change includes the change in the contact or separation state of the pressing member 70 relative to the intermediary transfer belt 21.

The pressing member 70 is supported by the pressing member holder 71. The pressing member 70 is fixed to the pressing member holder 71 over substantially full width with respect to the longitudinal direction at a fixing end portion which is one end portion (an upstream-side end portion with respect to the rotational direction of the intermediary transfer belt 21) with respect to the short direction.

The pressing member holder 71 is held by the frame or the like of the intermediary transfer belt unit 20 so as to be rotatable about a pressing member rotation shaft 71*a*. Thus, the pressing member holder 71 is rotated about the pressing member rotation shaft 71*a*, and the pressing member 70 is rotated about the pressing member rotation shaft 71*a*, so that the position of the pressing member 70 can be changed. By this, it is possible to change at least one of the penetration amount (pressing amount) of the pressing member 70 into the intermediary transfer belt 21 and the contact or separation state of the pressing member 70 relative to the intermediary transfer belt 21.

The pressing member holder 71 is constituted so as to be rotated by the action of a pressing cam 73 as an operation member. The pressing cam 73 is held by the frame or the like of the intermediary transfer belt unit 20 so as to be rotatable about a pressing cam rotation shaft 73*a*. The pressing cam 73 is rotated about the pressing cam rotation shaft 73*a* by receiving drive from a pressing cam motor 75 (pressing cam driving motor) 75 as a driving source. Further, the pressing cam 73 contacts a cam follower 71*b* provided as a part of the pressing member holder 71. Further, the pressing member holder 71 is urged by a rotation spring 72 constituted by a tension spring or the like, which is an urging member (elastic member), as an urging means. Further, in this embodiment, the image forming apparatus 100 is provided with a pressing cam position sensor 74 as a position detecting means for detecting a position of the pressing cam 73 with respect to the rotational direction, particularly a home position of the pressing cam 73 with respect to the rotational direction in this embodiment. The pressing cam position sensor 74 is constituted by including, for example, the pressing cam 73, a flag as an instruction portion provided coaxially with the pressing cam 73, and an optical sensor (photo-interruption) as a detecting portion.

Thus, in this embodiment, the pressing mechanism 102 is constituted by including the pressing member holder 71, the pressing cam 73, the pressing cam motor 75, the pressing cam position sensor 74, the rotation spring 72, and the like.

As shown in part (a) of FIG. 14, when the intermediary transfer belt 21 is pressed by the pressing member 70, the pressing cam 73 is driven and rotated clockwise by the pressing cam motor 75. By this, the pressing member holder 71 is rotated counterclockwise about the pressing member rotation shaft, so that a state in which the pressing member 70 is disposed in a position where the penetration amount of the pressing member 70 into the intermediary transfer belt 21 becomes a predetermined penetration amount is formed. At this time, the free end of the pressing member 70 contacts the inner peripheral surface of the intermediary transfer belt 21 in the neighborhood of the entrance of the secondary transfer portion N2 and protrudes the intermediary transfer belt 21 toward the outer peripheral surface side.

Further, as shown in part (b) of FIG. 14, when the pressing member 70 is separated from the intermediary transfer belt 21, the pressing cam is driven and rotated counterclockwise by the pressing cam motor 75. By this, the pressing member holder 71 is rotated clockwise about the pressing member rotation shaft 71*a*, so that a state in which the pressing member is disposed in a position where the pressing member 70 is separated from the intermediary transfer belt 21 is formed.

Incidentally, although the penetration amount is not limited to the above-described penetration amount, the penetration amount Y may suitably be about 3.5 mm or less. In the case where the penetration amount (pressing amount) is larger than this, a load exerted on a contact surface between the pressing member 70 and the intermediary transfer belt 21 increases, and therefore, there is a possibility that the intermediary transfer belt 21 is not readily rotated smoothly. Further, the pressing member 70 may desirably be brought as near to the inner roller 26 as possible, but may desirably be disposed so as not to contact the inner roller 26. The pressing member 70 can be disposed so that the inner peripheral surface of the intermediary transfer belt 21 and the free end of the pressing member 70 are in contact with each other in a position where the pressing member 70 is spaced from the position where the inner roller 26 and the intermediary transfer belt 21 are in contact with each other toward an upstream side with respect to the rotational direction of the intermediary transfer belt 21 by, for example, about 2 mm or more, typically 10 mm or more. Further, the pressing member 70 can be disposed so that the inner peripheral surface of the intermediary transfer belt 21 and the free end of the pressing member 70 are in contact with each other in a position where the pressing member 70 is spaced from the position where the inner roller 26 and the intermediary transfer belt 21 are in contact with each other toward the upstream side with respect to the rotational direction of the intermediary transfer belt by about 40 mm or less, typically about 25 mm or less. Further, the penetration amount Y may only be required to become a predetermined value when the recording material P passes through the neighborhood of the entrance of the secondary transfer portion N2 and through the secondary transfer portion N2. The neighborhood of the entrance of the secondary transfer portion N2 is specifically a region corresponding to a region of the intermediary transfer belt 21 from the contact position of the pressing member 70 with the intermediary to transfer belt 21 to the secondary transfer portion N2.

As described above, for example, in the case where the recording material P is the thick paper, the free end of the pressing member 70 is contacted to the inner peripheral surface of the intermediary transfer belt 21 in the neighborhood of the entrance of the secondary transfer portion N2, so that the stretching line (surface) T can be protruded toward the outside. By this, the contact distance D between the intermediary transfer belt 21 and the recording material P in the neighborhood of the entrance of the secondary transfer portion N2 can be increased, so that the scattering image can be suppressed.

Further, as described above, it becomes important that the intermediary transfer belt 21 is closely contacted to the recording material P, and therefore, depending on a difference in rigidity or a depth of the unevenness, it is possible to change the shape of the secondary transfer portion N2 and to make the change in position of the pressing member 70 in order to increase a pressing force. Specifically, in the case where the recording material P is normal paper (plain paper or the like), the pressing member 70 is disposed in a first position, and in the case where the recording material P is the embossed paper, the pressing member 70 can be disposed on a second position where the penetration amount Y is increased from the penetration amount Y in the first position. That is, in the case where the recording material P with surface unevenness such as the embossed paper is used, a transfer property at a recessed portion (for example, in a depth of 80-140 μm) lowers in some instances. This is due to the following reason. That is, gap electric discharge at the recessed portion of the recording material P generates at a portion where the intermediary transfer belt 21 and the recording material P are not readily closely contacted to each other on the side upstream of the secondary transfer portion N2 during the secondary transfer. Then, by this electric charge, the toner becomes the toner which is not readily transferred onto the recording material P, on the intermediary transfer belt 21 before entering the secondary transfer portion N2.

By this, the resultant image becomes an image such that the toner is scattered. On the other hand, during the use of the embossed paper, when the inner peripheral surface of the intermediary transfer belt 21 is pressed by the pressing member 70, the recording material P and the intermediary transfer belt 21 are closely contacted to each other to a portion spaced from the secondary transfer portion toward the upstream side. For that reason, the gap electric charge at the recessed portion of the recording material P is suppressed, so that the transfer property is improved.

In this embodiment, the home position of the pressing member 70 is set at a position where the pressing member 70 is separated from the intermediary transfer belt 21 or where the pressing member 70 contacts the intermediary transfer belt 21 in the penetration amount Y (for example, 0 to 1 mm) smaller than the penetration amount Y during the image formation (during the secondary transfer). In the stand-by state of the image forming apparatus 100, or in the power OFF state or the sleep state of the image forming apparatus 100, the pressing member 70 is disposed in the home position. Then, when the job requirement is inputted, the pressing member 70 is disposed in the first position (for example, a position where the penetration amount Y is 1.5 mm) corresponding to the plain paper, and then drive of the intermediary transfer belt or the like is started. Further, in the case where the toner image is transferred onto the embossed paper, the pressing member 70 is disposed in the second position (for example, a position where the penetration amount Y is 3.0 mm). Incidentally, the first position may also be a position where the penetration amount is 0 mm (for example, a spaced position).

5. Control Procedure

Next, an operation of the job in this embodiment will be described. FIG. 15 is a flowchart showing an outline of a procedure of the job in this embodiment. As described above, the color misregistration occurs in some instances by the change in attitude of the intermediary transfer belt 21 with the change in penetration amount of the pressing member 70. For that reason, in this embodiment, the image forming apparatus 100 performs the color registration adjustment in the case where the change in penetration amount of the pressing member 70 is made. In this embodiment, description will be made by taking, as an example, a job (mixed job) in which the embossed paper as the recording material P and a recording material P, such as the plain paper, other than the embossed paper are used. Incidentally, in this embodiment, for example, in the case where the job is started from the sleep state of the image forming apparatus 100, drive of the intermediary transfer belt 21 is started after the pressing member 70 is disposed in the first position (for example, the position where the penetration amount Y is +1.5 mm) as described above.

When the start of the job is required, the controller 150 starts drive of the photosensitive drum 1, the intermediary transfer belt 21, and the like and discriminates, on the basis of information of the job, whether or not the recording material P on which the image is subsequently formed is not the embossed paper (S201). In the case where the controller 150 discriminated in S201 that the recording material P is not the embossed paper ("Yes"), the controller 150 discriminates whether or not the position of the pressing member 70 is the first position corresponding to a first penetration amount (penetration amount: "small") (S202). In the case where the controller 150 discriminated in S202 that the position of the pressing member 70 is the first position ("Yes"), image formation is carried out without changing the penetration amount Y (S203). Thereafter, the controller 150 discriminates whether or not all the images in the job are formed (S204). Then, in the case where the controller 150 discriminated in S204 that all the images in the job are formed ("Yes"), the operation of the job is ended, and in the case where the controller 150 discriminated in S204 that all the images in the job are not ended ("No"), the process returns to the process of S201.

Further, in the case where the controller 150 discriminated in S201 that the recording material P is the embossed paper ("No"), the controller 150 discriminates whether or not the position of the pressing member 70 is the first position corresponding to the first penetration amount (penetration amount: "small") (S205). In the case where the controller 150 discriminated in S205 that the penetration amount Y is the first position ("Yes"), the controller 150 performs the following operation. That is, in order to meet the embossed paper, the controller 150 causes the pressing mechanism 102 to move the pressing member 70, so that the position of the pressing member 70 is changed to the second position contacting to a second penetration amount (penetration amount: "large") (S207). Then, the controller 150 executes the color registration adjustment (S208) since the controller 150 thus changed the position of the pressing member 70. Here, the controller 150 starts the color registration adjustment (specifically, formation of a pattern image on the intermediary transfer belt 21) after waiting a lapse of a time from the change of the penetration amount Y (specifically, the change in position of the pressing member 70 is completed) until shift behavior of the intermediary transfer belt 21 is stabilized. Thereafter, the controller 150 causes the image forming apparatus 100 to carry out the image formation (S203). Subsequent operations are similar to those described above. On the other hand, in the case where the controller 150 discriminated in S205 that the present position of the pressing member 70 is the second position corresponding to the second penetration amount (penetration amount: "large") ("No"), the controller 150 causes the image forming apparatus 100 to carry out the image formation without changing the offset amount X (S203). Subsequent operations are similar to those described above.

Further, in the case where the controller 150 discriminated in S202 that the present position of the pressing member 70 is the second position corresponding to the second penetration amount (penetration amount: "large") ("No"), the controller 150 performs the following operation. That is, in order to meet the recording material P, such as the plain paper, other than the embossed paper, the controller 150 causes the pressing mechanism 102 to move the pressing member 70, and thus changes the position of the pressing member 70 to the first position corresponding to the first penetration amount (penetration amount: "small") (S206). Then, the controller 150 executes the color registration adjustment since the controller 150 changed the position of the pressing member 70 (S208). Subsequent operations are similar to those described above.

Thus, the change in penetration amount Y has the influence similar to the influence of the change in offset amount X in the embodiment 1, and therefore, in this embodiment, in the case where the change in penetration amount Y is made, the color registration adjustment is executed.

As described above, in this embodiment, the image forming apparatus 100 includes the plurality of stretching rollers which are for stretching the belt 21 and which includes the inner roller 26 and the upstream roller 29 disposed upstream of and adjacent to the inner roller 26 with respect to the rotational direction of the belt 21, the pressing member 70 capable of contacting the inner peripheral surface of the belt 21 on the side upstream of the inner roller 26 and downstream of the upstream roller 29 with respect to the rotational direction of the belt 21 and capable of pressing the belt 21 from the inner peripheral surface side toward the outer peripheral surface side, the position changing mechanism 102 capable of changing at least one of the pressing amount of the pressing member 70 against the belt 21 and the contact or separation stale of the pressing member 70 relative to the belt 21 by changing the position of the pressing member 70, and the controller 150 capable of executing the adjusting operation in which the adjusting toner images are formed on the belt 21 by the plurality of image forming portions 10 and in which on the basis of the detection result of the adjusting toner images by the toner image detecting portion 116, the adjusting value for adjusting the image writing position with respect to the widthwise direction of the belt in at least one of the plurality of image forming portions 10 is acquired. Further, in this embodiment, the controller 150 is capable of carrying out control so as to execute the above-described adjusting operation in the case where the position of the pressing member 70 is changed by the position changing mechanism 102. In this embodiment, the controller 150 is capable of carrying out control so as to execute the above-described adjusting operation before the toner image transferred onto a subsequent recording material is formed in the case where during execution of the job for transferring the toner images on the plurality of recording materials P, the above-described position of the pressing member 70 is changed by the position changing mechanism 102 after the toner image is transferred onto the preceding recording material P. Incidentally, although specifically described in an embodiment 3, in the case where a predetermined condition is satisfied in the case where during the execution of the job for transferring the toner images on the plurality of recording materials P, the above-described position of the pressing member 70 is changed by the position changing mechanism 102 after the toner image is transferred onto the preceding recording material, the controller 150 is capable of executing the above-described adjusting operation before the toner image transferred onto the subsequent recording material P is formed. Further, in the case where the above-described predetermined condition is not satisfied, it is possible to form the toner image transferred onto the subsequent recording material P without executing the above-described adjusting operation.

6. Effect of this Embodiment

As described above, according to this embodiment, the change corresponding to the change in offset amount X in the embodiment 1 is the change in penetration amount of the pressing member 70, and the execution or non-execution of the change was discriminated depending on whether the recording material P is the embossed paper or the plain paper. However, an entire flow is similar to the flow in the embodiment 1. In this embodiment, in the constitution in which the shape (attitude) of the intermediary transfer belt 21 in the neighborhood of the secondary transfer portion N2 is changeable, the color misregistration with this change can be suppressed. By this, also, according to this embodiment, the color misregistration can be suppressed while meeting a variety of recording materials P different in thickness (basis weight), surface property, and the like.

Incidentally, in this embodiment, the case where the penetration amount of the pressing member 70 is changed depending on whether the recording material P is the embossed paper or the plain paper was described as an example, but the present invention is not limited thereto. For example, similar discrimination is made also in the case where the penetration amount of the pressing member 70 is changed depending on the basis weight of the recording material P, and when the change in penetration amount is made, it is possible to suppress the color misregistration by executing the color registration adjustment. Further, in this embodiment, the case where the penetration amount during the image formation (during the secondary transfer) can be changed to the two penetration amounts was described, but also, in the case where the penetration amount can be changed to three penetration amounts, it is possible to obtain a similar effect by similarly performing the color registration adjustment after changing the penetration amount to each of the respective penetration amounts.

Further, in addition to the change in offset amount in the embodiment 1, for example, in order to obtain a sufficient transfer property even for the recording material P such as the embossed paper with surface unevenness, the shape of the intermediary transfer belt 21 in the neighborhood of the secondary transfer portion N2 may be further changed by the pressing member 70. That is, the image forming apparatus 100 may include both the offset mechanism 101 in the embodiment 1 and the pressing mechanism 102 in this embodiment. In the case where the offset amount and the penetration amount are changed in synchronism with each other at the same timing (in the same sheet interval), similar control can be carried out in accordance with the procedure of the embodiment 1 or this embodiment. Further, in the case where only either one of the offset amount and the penetration amount is changed at one timing (in one sheet interval), similar control can be carried out in accordance with the procedure of each of the embodiment 1 and this embodiment.

For example, the above-described "scattering" and the image defect ("shock image") at leading and trailing ends of the recording material P, which are caused in the case where the rigidity (thickness) of the recording material P is large, the pressing member 70 is disposed upstream of the secondary transfer portion N2 with respect to the rotational direction of the intermediary transfer belt 21, so that the intermediary transfer belt 21 is protruded toward the outside, so that these defects can be effectively suppressed. For that reason, in the case where the offset amount X is changed so as to be made small when the rigidity (thickness) of the recording material P is large, it is desirable that the intermediary transfer belt 21 is protruded toward the outside by the pressing member 70 in synchronism with the change. On the other hand, for example, in the case where the rigidity (thickness) of the recording material P is small, when the offset amount X is made large and the intermediary transfer belt 21 is protruded toward the outside by the pressing member 70, the following phenomenon occurs. That is, the contact distance D becomes excessively large, so that an image defect, which is so-called "roughening" (or "toner image deviation"), such that the toner image is dynamically disturbed by friction between the toner image and the recording material P, occurs in some instances. Therefore, in the case where the position of at least one of the inner roller 26 and the outer roller 41 (the position of the inner roller 26 in this embodiment) is changed and thus the offset amount X is largely changed, a constitution, in which the position of the pressing member 70 is changed in synchronism with the above-described change and thus the penetration amount Y is changed so as to be made small, can be employed. Incidentally, the changes of the offset amount X and the penetration amount Y in synchronism with each other refer to the following change. Typically, in the case where the image is formed on a certain recording material P, when the offset amount X is changed before the recording material P reaches the secondary transfer portion N2, the penetration amount Y is also changed before the recording material P reaches the secondary transfer portion N2.

Further, in this embodiment, the pressing member 70 is capable of being separated from the inner peripheral surface of the intermediary transfer belt 21, but the present invention is not limited thereto. In the case where the penetration amount Y is 0 mm, the pressing member 70 may contact the intermediary transfer belt 21. Further, the state of the penetration amount Y may only be required to be changed to a different state, so that a constitution in which the penetration amount Y does not become 0 may also be employed.

Embodiment 3

Next, another embodiment of the present invention will be described. Basic constitutions and operations of an image forming apparatus in this embodiment are the same as those of the image forming apparatus in the embodiment 1. Accordingly, in the image forming apparatus of this embodiment, elements having the same or corresponding functions or constitutions as those in the embodiment 1 are represented by the same reference numerals or symbols as those in the embodiment 1 and will be omitted from detailed description.

1. Outline of this Embodiment

In the embodiment 1, in the case where the offset amount was changed, the color registration adjustment was performed every time, so that the occurrence of the color misregistration was suppressed. However, for example, depending on a manner of use by a user, there is a case that recording materials of kinds necessary to be changed in offset amount are frequently used in mixture and image formation is carried out. In that case, in the control of the embodiment 1, the color registration adjustment is performed at high frequency. At this time, in addition to the change in offset amount, the color registration adjustment is performed in each case, so that there arises a problem of a lowering in productivity. Therefore, in this embodiment, control in which the occurrence of the color misregistration is suppressed while suppressing the lowering in productivity is executed.

2. Condition for Performing Color Registration Adjustment

The color registration adjustment is required to be performed depending on the change in attitude of the intermediary transfer belt as described above. Further, as another condition, in the case where the number of sheets subjected to the image formation reaches a predetermined number of sheets or in the case where an inside temperature of the image forming apparatus changes by a predetermined temperature or more, the image forming apparatus is set so as to execute the color registration adjustment in some instances. That is, the color registration adjustment is executed in some instances for making correction with thermal deformation of respective members in a process such that the toner images are superposed from exposure by heat generated by repeating the image formation. In general, the influence of the thermal deformation of lenses inside the exposure device for forming the latent image on the photosensitive member occupies a largest change, and depending on the constitution of the image forming apparatus, the color registration adjustment is performed at a frequency of once per several minutes. However, the color registration adjustment is not performed in the sheet interval in each case, but is performed in general in the case where the number of sheets subjected to the image formation satisfies a predetermined condition or in the case where a temperature of a thermistor provided separately satisfies a predetermined condition. Incidentally, the thermistor is an example of an environment detecting means for detecting at least one of a temperature and a humidity of at least one of an inside and an outside of the image forming apparatus. Thus, the color registration adjustment can be roughly classified into two color registration adjustments performed periodically and with a certain change. Each of the color registration adjustments will be described.

The color registration adjustment performed periodically meets, for example, the change with time due to the above-described thermal deformation, and is performed every satisfaction of a predetermined condition by the number of sheets subjected to the image formation or the inside temperature of the image forming apparatus. As shown in FIG. 2, when the color registration adjustment is executed, the adjusting value is stored in the storing portion 152. The adjusting value stored in the storing portion 152 is used until subsequent color registration adjustment is executed, but when the color registration adjustment is newly executed, a mechanism in which an adjusting value therefor is rewritten to a new value is used.

Further, in this embodiment, for storing the adjusting value for the color registration adjustment, as shown in FIG. 2, the storing portion (storage area) is used for the number corresponding to the number of possible offset amounts. In this embodiment, the number of the possible offset amounts is two, and therefore, two storing portions 152*a* and 152*b* are used. The adjusting value for the color registration adjustment executed when the offset amount X is +2.5 mm which is a first offset amount X1 is stored in the first storing portion 152*a*. Further, the adjusting value for the color registration adjustment executed when the offset amount X is −1.3 mm which is a second offset amount X2 is stored in the second storing portion 152*b*. The adjusting values stored in the first and second storing portions 152*a* and 152*b* are updated (rewritten) to newly acquired adjusting values when the color registration adjustment is newly made in a state of the offset amount corresponding to each of the adjusting values.

Here, in the case of a change from a state of an offset amount determined in advance to an offset amount determined similarly in advance, the influence of the change on the color misregistration is uniquely determined in the case where the change does not accompany the change with time due to the above-described thermal deformation. Accordingly, in the case where the offset amount is changed and a state in which the color misregistration occurs is formed, when the offset amount is returned to the original amount from the state, the color misregistration is eliminated. When a timing falls within at least the above-described interval of the color registration adjustment executed periodically, the influence of the thermal deformation is small and can be regarded as a reversible change.

From this, in this embodiment, for example, the following control is carried out for suppressing the occurrence of the color misregistration while suppressing a lowering in productivity which becomes a problem depending on a manner of use by the user.

3. Control Procedure

Next, an operation of a job in this embodiment will be described. FIG. 16 is a flowchart showing an outline of procedure of the job in this embodiment. In this embodiment, the job (mixed job) in which a plurality of kinds of recording materials P different in basis weight will be described as an example. Similarly as in the embodiment 1, the state in which the offset amount X is +2.5 mm is the home position and, for example, in the case where the job is started from the sleep state, the operation of the job such as the drive of the intermediary transfer belt 21 is started from the state in Which the offset amount X is +2.5 mm. Incidentally, in the procedure of FIG. 16, processes similar to those in the procedure of FIG. 9 described in the embodiment 1 will be appropriately omitted from description.

Processes S301 to S307 of FIG. 16 are similar to the procedures S101 to S107 of FIG. 9 in the embodiment 1. Then, in this embodiment, after the controller 150 changes the offset amount X in S306 or S307, the adjusting value for the changed offset amount X is last stored in the storing portion 152, and then the controller 150 discriminates whether or not periodical color registration adjustment is executed (S308). In the case where the periodical color registration adjustment is not executed, the influence by the thermal deformation would be considered as being small, and therefore, the adjusting value acquired in the color registration adjustment last executed in the offset amount X after this change can be used. In this case, when the offset amount X after this change is the first offset amount X1 (+2.5 mm), the adjusting value last stored in the first storing portion 152*a* can be used. Further, when the offset amount X after this change is the second offset amount X2 (−1.3 mm), the adjusting value last stored in the second storing portion 152*b* can be used. For that reason, in the case where the controller 150 discriminated in S308 that the periodical color registration adjustment is not executed ("Yes"), the adjusting value acquired in the last color registration adjustment is used without executing the color registration adjustment (S309). On the other hand, in the case where the controller 150 discriminated in S308 that the periodical color registration adjustment is executed ("No"), the influence by the thermal deformation is taken into consideration and the color registration adjustment is executed (S310). Subsequent operations are similar to those in the embodiment 1.

For example, first, the color registration adjustment is executed in the state in which the offset amount X is +2.5 mm, and the adjusting value acquired at that time is stored as an adjusting value for the offset amount X=+2.5 mm in the first storing portion 152*a*. Thereafter, when the color registration adjustment is executed after the offset amount X is changed to −1.3 mm, an acquired value is stored as an adjusting value for the offset amount X=−1.3 min in the second storing portion 152*b*. In this state, in the case where the offset amount X is required to be returned to +2.5 mm again, the following operation is performed. That is, in the case where the periodical color registration adjustment is not executed once from the color registration adjustment last executed in the state in which the offset amount X is +2.5 min, when the offset amount X is returned to +2.5 mm, the adjusting value stored in the first storing portion 152*a* may only be required to be used as it is. By this, there is no need to execute the color registration adjustment. On the other hand, in the case where the periodical color registration adjustment is executed, in view of the influence by the thermal deformation, the adjusting value for the last offset amount X=+2.5 mm stored in the first storing portion 152*a* is discarded, and then the color registration adjustment is executed. Further, the adjusting value stored in the first storing portion 152*a* is updated to an adjusting value newly acquired by the color registration adjustment.

Incidentally, for simplification, in the above, description was omitted, but in S308, the controller 150 also discriminated whether or not the adjusting values are stored in the first and second storing portions 152*a* and 152*b*.

Then, in the case where the last adjusting value for the offset amount X after the present change is not stored, even under a condition such that the last adjusting value can be utilized as described above, the procedure goes to S310, and the controller 150 carries out control so as to execute the color registration adjustment.

Here, for example, in the pre-rotation step or the pre-multi-rotation step of the job, the color registration adjustment is executed in at least one of the offset amounts X (for example, the offset amount X during a start of the job such as the home position), and the adjusting value can be stored in the storing portion 152. In the pre-rotation step or the pre-multi-rotation step, the color registration adjustment is executed in each of a plurality of (for example, all possible) offset amounts X, so that each adjusting value can be stored in the storing portion 152. Further, the adjusting value available in the job and stored in the storing portion 152 is not limited to the adjusting value acquired in the pre-rotation step or the pre-multi-rotation step of the job. Such an adjusting value may also be adjusting values acquired by the color registration adjustments executed during the execution (sheet interval) of the last job or the previous job, in the pre-rotation step or the pre-multi-rotation step of the job, during factory shipping of the image forming apparatus 100, during first adjustment after installation of the image forming apparatus 100, during the present or previous power-on of the image forming apparatus 100, and the like. Further, even in the case where the adjusting value is not acquired in advance, when the above-described periodical color registration adjustment is executed, an adjusting value for the offset amount at that time is acquired.

As described above, in this embodiment, the image forming apparatus 100 includes the first storing portion 152*a* for storing the first adjusting value acquired by the controller 150 in a state in which the relative position between the inner roller 26 and the outer member 41 with respect to the circumferential direction of the inner roller 26 is a first relative position and includes the second storing portion 152*b* for storing the second adjusting value acquired by the controller 150 in a state in which the relative position is a second relative position different from the first relative position. The controller 150 is capable of carrying out control so as to execute adjustment of the image writing position with use of the first adjusting value stored in the first storing portion 152*a* when the toner image is formed in the first relative position as the above-described relative position and so as to execute adjustment of the image writing position with use of the second adjusting value stored in the second storing portion 152*b* when the toner image is formed in the second relative position as the above-described relative position. In this embodiment, in the case where the above-described relative position is changed from the first relative position to the second relative position and then is returned to the first relative position and in the case where the predetermined condition is satisfied, the controller 150 carries out control so as to update the first adjusting value stored in the first storing portion 152*a* by executing the adjusting operation before the toner image is subsequently formed on the recording material P. In this embodiment, the predetermined condition is such that the adjusting operation periodically executed irrespective of the above-described relative position is executed from last storage of the first adjusting value in the first storing portion 152*a* until the above-described relative position is returned to the first relative position. Further, in this embodiment, in the case where the above-described relative position is changed from the first relative position to the second relative position and then is returned to the first relative position and in the case where the predetermined condition is not satisfied, the toner image subsequently formed on the recording material P is formed without executing the above-described adjusting operation. Further, in this embodiment, in the case where the above-described relative position is changed from the second relative position to the first relative position and then is returned to the first relative position and in the case where the predetermined condition is satisfied, the controller 150 carries out control so as to update the second adjusting value stored in the second storing portion 152*b* by executing the adjusting operation before the toner image is subsequently formed on the recording material P. In this embodiment, the predetermined condition is such that the adjusting operation periodically executed irrespective of the above-described relative position is executed from last storage of the second adjusting value in the second storing portion 152*b* until the above-described relative position is returned to the second relative position.

4. Effect of this Embodiment

As described above, according to this embodiment, in an available case, by using the previous adjusting value stored in the storing portion 152, there is no need to execute the color registration adjustment. For that reason, for example, depending on the manner of use by the user, even in the case where there is a need to frequently execute the adjustment of the offset amount in the control in the embodiment 1, it is possible to suppress the occurrence of the color misregistration while suppressing the lowering in productivity.

Further, in this embodiment, it cannot be said that there is no influence of the thermal deformation on the attitude of the intermediary transfer belt 21, so that execution or non-execution of the periodical color registration adjustment is used as a discrimination criterion as to whether or not the last adjusting value can be utilized. However, it can be assumed that there is a case that the influence of heat on the change in attitude of the intermediary transfer belt 21 due to the change in offset amount is sufficiently small, and the change can always be regarded as a reversible change. In this case, for example, an adjusting value for the color registration adjustment is acquired and stored in advance for each of the offset amounts, or a change in attitude of the intermediary transfer belt 21 with the change in offset amount is stored in advance. Then, by using information thereon, depending on the change in offset amount, it is also possible to correct the color misregistration without executing any color registration adjustment.

Further, as the predetermined condition, non-execution of the periodical color registration adjustment was used as a condition in which the last adjusting value can be utilized. However, more directly, a condition that the number of sheets subjected to the image formation reaches the predetermined number of sheets or that the inside temperature of the image forming apparatus does not change by a predetermined image or more may be used as the predetermined condition. For example, in S308 of FIG. 16, after the adjusting value is last stored in the storing portion 152 for the offset amount X after the change, the controller discriminates whether or not the number of sheets subjected to the image formation has reached the predetermined number of sheets or whether or not the inside temperature of the image forming apparatus has changed by the predetermined temperature or more.

Further, in the case where the number of sheets subjected to the image formation does not reach the predetermined number of sheets or in the case where the inside temperature of the image forming apparatus does not change by the predetermined temperature or more, the color registration adjustment can be made unable to be executed using the last adjusting value. Thus, if the influence of the change in offset amount on the change in attitude of the intermediary transfer belt 21 is in a sufficiently small state and the condition is such that discrimination that the change can be regarded as the reversible change can be made, the condition can be appropriately used.

Further, in this embodiment, description was made on the basis of the change in offset amount similarly as in the embodiment 1, but instead of the change in offset amount, also as regards the change in position (penetration amount) of the pressing member 70 described in the embodiment 2, the principle of this embodiment can be applied, so that an effect similar to those described above can be obtained. As regards detailed description of this case, description of this embodiment is invoked by reading the change in offset amount as the change in position (attitude) of the pressing member 70.

Embodiment 4

Next, another embodiment of the present invention will be described. Basic constitutions and operations of an image forming apparatus in this embodiment are the same as those of the image forming apparatus in the embodiment 1. Accordingly, in the image forming apparatus of this embodiment, elements having the same or corresponding functions or constitutions as those in the embodiment 1 are represented by the same reference numerals or symbols as those in the embodiment 1 and will be omitted from detailed description.

1. Outline of this Embodiment

In the embodiment 3, the change in attitude of the intermediary transfer belt 21 with the change in offset amount being influenced by the thermal deformation was assumed. However, in the case where the change in attitude of the intermediary transfer belt 21 is not influenced by the thermal deformation, by storing a value of a difference in adjusting value for the color registration adjustment before and after the change in attitude, it is possible to decrease the frequency of the color registration adjustment.

2. Outline of Control

When the adjusting values for the color registration adjustment are acquired in the state in which the offset amount X is +2.5 mm and in the state in which the offset amount X is −1.3 mm, respectively, a difference value therebetween is acquired and then is stored in the storing portion 152. Incidentally, for example, the adjusting values may be stored in the storing portions 152*a* and 152*b*, respectively, similarly as in the embodiment 3 until the adjusting values in the states of the associated offset amounts X, respectively, are acquired and then a difference value thereof is acquired. Further, when the difference value is acquired, the color misregistration correction can be made by using the difference value. By this, there is no need to execute the color registration adjustment even when the change in attitude of the intermediary transfer belt 21 with the change in offset amount X occurs.

Incidentally, each of the adjusting values for color registration adjustments in the offset amounts X can be acquired by executing the associated color registration adjustment in advance or can be acquired by executing the associated color registration adjustment when the associated offset amount X is first set. For example, in the pre-rotation step or the pre-multi-rotation step of the job, the color registration adjustment is executed in at least one of the offset amounts X (for example, the offset amount X during a start of the job such as the home position), and the adjusting value can be stored in the storing portion 152. In the pre-rotation step or the pre-multi-rotation step, the color registration adjustment is executed in each of a plurality of (for example, all possible) offset amounts X, so that each adjusting value can be stored in the storing portion 152. Further, the adjusting value available in the job and stored in the storing portion 152 is not limited to the adjusting value acquired in the pre-rotation step or the pre-multi-rotation step of the job. Such an adjusting value may also be adjusting values acquired by the color registration adjustments executed during the execution (sheet interval) of the last job or the previous job, in the pre-rotation step or the pre-multi-rotation step of the job, during factory shipping of the image forming apparatus 100, during first adjustment after installation of the image forming apparatus 100, during the present or previous power-on of the image forming apparatus 100, and the like. Further, even in the case where the adjusting value is not acquired in advance, when the above-described periodical color registration adjustment is executed, an adjusting value for the offset amount at that time is acquired. That is, after the adjusting values for the associated offset amounts X are acquired, the difference value thereof can be used. Control similar to the control in the embodiment 1 can be carried out until the difference value can be acquired.

3. Control Procedure

Next, an operation of a job in this embodiment will be described. FIG. 17 is a flowchart showing an outline of a procedure of the job in this embodiment. In FIG. 17, the procedure from acquisition of each offset amount X which is a feature of this embodiment is shown. In the procedure of FIG. 17, processes similar to those in the procedure of FIG. 9 will be appropriately omitted from description.

Processes S401 to S407 of FIG. 17 are similar to the processes S101 to S107 of FIG. 9 in the embodiment 1. Further, in this embodiment, after the change in offset amount X is made in S406 or S407, the color misregistration correction is made in the following manner (S408). That is, the difference value between the adjusting value for the color registration adjustment executed in the state in which the offset amount X is +2.5 mm and the adjusting value for the color registration adjustment executed in the state in which the offset amount X is −1.3 mm is used as a correction value, and then the image writing position (image writing timing) after the change is adjusted. This difference value is stored in the storing portion 152 as described above. Subsequently operations are similar to those in the embodiment 1.

For example, in the case where the offset amount X is changed from the first offset amount X1 to the second offset amount X2, the color misregistration correction is made by delaying the image writing timing with respect to the main scan direction by an amount corresponding to an absolute value of the above-described difference value. In this case, when the offset amount X is changed from the second offset amount X2 to the first offset amount X1, the color misregistration correction can be made by making the image writing timing with respect to the main scan direction earlier by the amount corresponding to the absolute value of the above-described difference value. Incidentally, a difference value including positive and negative signs in the case where the offset amount X is changed from the first offset amount X1 to the second offset amount X2 and a difference value including positive and negative sign in the case where the offset amount X is changed from the second offset amount X2 to the first offset amount X1 may be stored.

As described above, in this embodiment, the image forming apparatus 100 includes the first storing portion 152 for storing a difference value between the first adjusting value acquired by the controller 150 in a state in which the relative position between the inner roller 26 and the outer member 41 with respect to the circumferential direction of the inner roller 26 is a first relative position and the second adjusting value acquired by the controller 150 in a state in which the relative position is a second relative position different from the first relative position. The controller 150 is capable of carrying out control so as to execute adjustment of the image writing position with use of the above-described difference value stored in the storing portion 152 when the toner image is formed after the relative position is changed from the first relative position to the second relative position and when the toner image is formed after the relative position is changed from the second relative position to the first relative position.

4. Effect of this Embodiment

As described above, for example, in the case where the change in attitude of the intermediary transfer belt 21 is not influenced by the thermal deformation or in the like case, by the control in this embodiment, it is possible to suppress the color misregistration without executing the color registration adjustment.

Further, in this embodiment, description was made on the basis of the change in offset amount similarly as in the embodiment 1, but instead of the change in offset amount, also as regards the change in position (penetration amount) of the pressing member 70 described in the embodiment 2, the principle of this embodiment can be applied, so that an effect similar to those described above can be obtained. As regards detailed description of this case, description of this embodiment is invoked by reading the change in offset amount as the change in position (attitude) of the pressing member 70.

Other Embodiments

The present invention was described above based on specific embodiments, but is not limited thereto.

In the above-described embodiments, as the information on the thickness of the recording material, the basis weight inputted through the operating portion is acquired, but the present invention is not limited thereto. For example, a detecting means for detecting the thickness of the recording material is provided in the image forming apparatus and control based on information on the thickness of the recording material detected by this detecting means can also be carried out. For example, as a detecting means for detecting an index value correlating attenuation of ultrasonic wave has been known. Incidentally, the detecting means is not limited to the detecting means using the ultrasonic wave if the detecting means is capable of detecting the index value correlating the basis weight with the thickness of the recording material, but for example, the detecting means using light can be used.

Further, in the above-described embodiments, as the information on the surface property of the recording material, the information on the kind of the recording material inputted through the operating portion is acquired, but the present invention is not limited thereto. For example, if numerical information on surface roughness of the recording material through the operating portion is enabled, control based on the acquired numerical information on the surface roughness can also be carried out. Further, a detecting means for detecting the surface roughness of the recording material is provided in the image forming apparatus, and control based on the information on the surface roughness of the recording material detected by this detecting means can also be carried out. For example, as a detecting means for detecting an index value correlated with the surface property of the recording material, a regular/irregular reflection photo-sensor, in which the recording material is irradiated with light and intensity of each of regular reflection light and irregular reflection light is read by a light quantity sensor, has been known. Incidentally, such a sensor is not limited to the sensor using the above-described light quantity sensor if the sensor is capable of detecting an index value correlated with surface smoothness of the recording material, but for example, a regular-/irregular reflection photo-sensor using an image pick-up element can be used. The index value correlated with the surface smoothness of the recording material is not limited to a value converted into a value according to a predetermined standard such as Bekk smoothness, but may only be required to be a value correlated with the surface smoothness of the recording material.

Further, as in the above-described embodiments, in the case where the information (information on the thickness and the surface property) on the recording material is inputted through the operating portion, such input is not limited to input (including selection from a plurality of choices) such that the information on the recording material is directly inputted through the operating portion. For example, a predetermined recording material storage is selected from a plurality of recording material storages, so that information on the recording material, accommodated in the predetermined recording material storage, which is stored in the storing portion in association with the predetermined recording material storing in advance may be acquired.

Further, information such as the information on the recording material is not limited to the information inputted through the operating portion of the image forming apparatus. The information may be capable of being inputted from an external device communicatably connected to the image forming apparatus. In this case, the above-described interface (input/output circuit or the like functions as an input portion for inputting the information to the controller.

Further, in the above-described embodiments, the information is constituted so as to change the offset amount by changing the position of the inner roller, but may also be constituted so as to change the offset amount by changing a position of the outer roller. Further, such a constitution is not limited to a constitution in which either one of the inner roller and the outer roller is moved, but the offset amount may be changed by moving both the inner roller and the outer roller.

Further, in the above-described embodiments, as the outer member for forming the secondary transfer portion in combination with the inner roller as the inner member, the outer roller directly contacting the outer peripheral surface of the intermediary transfer belt was used. On the other hand, a constitution as the outer member, the outer roller and a secondary transfer belt stretched by the outer roller and other rollers may be employed. That is, the image forming apparatus may include, as the outer member, the stretching rollers, the outer roller, and the secondary transfer belt stretched by these rollers. Further, the outer roller can be made contactable to the outer peripheral surface of the intermediary transfer belt. In such a constitution, the inner roller contacting the inner peripheral surface of the intermediary transfer belt and the outer roller contacting the inner peripheral surface of the secondary transfer belt form the secondary transfer portion by sandwiching the intermediary transfer belt and the secondary transfer belt therebetween. In this case, a contact portion between the intermediary transfer belt and the secondary transfer belt is the secondary transfer portion (secondary transfer nip). Incidentally, also, in this case, the offset amount X is defined by the relative position between the inner roller and the outer roller similarly as described above. Further, also, the penetration amount Y is defined similarly as described above by using the reference line L1 formed by the inner roller and the pre-secondary transfer roller and the pressing portion tangential line L4 or by using the reference line L1' formed by the outer roller and the pre-secondary transfer roller and the pressing portion tangential line L4'.

In the above-described embodiments, as the offset mechanism and the pressing mechanism, an actuator for actuating the movable portion by the cam was used, but the offset mechanism is not limited thereto. Each of the offset mechanism and the pressing mechanism may only be required to be capable of realizing an operation in conformity to each of the above-described embodiments and, for example, an actuator for actuating the movable portion by using a solenoid may be used.

Further, in the above-described embodiments, the case where the belt-shaped image bearing member was the intermediary transfer belt was described, but the present invention is applicable when an image bearing member constituted by an endless belt for feeding the toner image borne at the image forming position is used. Examples of such a belt-shaped image bearing member may include a photosensitive (member) belt and an electrostatic recording dielectric (member) belt, in addition to the intermediary transfer belt in the above-described embodiments.

Further, the present invention can be carried out also in other embodiments in which a part or all of the constitutions of the above-described embodiments are replaced with alternative constitutions thereof. Accordingly, when the image forming apparatus using the belt-shaped image bearing member is used, the present invention can be carried out with no distinction as to tandem type/single drum type, a charging type, an electrostatic image forming type, a developing type, a transfer type and a fixing type. In the above-described embodiments, a principal part relating to the toner image formation/transfer was described principally, but the present invention can be carried out in various uses, such as a printers, various printing machines, copying machines, facsimile machines and multi-function machines, by adding necessary device, equipment and a casing structure.

According to the present invention, in the constitution in which the position (shape) of the transfer portion or the shape (attitude) of the belt in the neighborhood of the transfer portion is changeable, the color misregistration with the change can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-071201 filed on Apr. 22, 2022, which is hereby incorporated by reference herein in its entirety.

What is claimed is:

1. An image forming apparatus comprising:
- a plurality of image forming portions configured to form toner images;
- a rotatable endless belt on which the toner images are formed by the image forming portions;
- a plurality of stretching rollers configured to stretch the belt, the stretching rollers including an inner roller configured to form a transfer portion where the toner images are transferred from the belt onto a recording material;
- to an outer roller configured to form the transfer portion between the outer roller and the inner roller;
- a position changing mechanism capable of changing a position of the transfer portion with respect to a circumferential direction of the inner roller by changing a position of the inner roller;
- an image detecting portion configured to detect an image; and
- a controller configured to execute an adjusting operation in which a registration adjusting image is formed by the image forming portions and is detected by the image detecting portion and then in which on the basis of a detection result of the registration adjusting image by the image detecting portion, adjustment of image writing positions of the image forming portions is made,
- wherein during execution of a job for forming first toner images on a first recording material and second toner images on a second recording material subsequent to the first recording material, in a case that a changing operation for changing the position of the inner roller by the position changing mechanism after the first toner images are formed on the first recording material and before the second toner images are transferred onto the second recording material is executed, the registration adjusting image is formed between the first toner images and the second toner images.

2. An image forming apparatus according to claim 1, wherein the contract is configured to execute a first adjusting operation for executing the adjusting operation with execution of the changing operation and a second adjusting operation for executing the adjusting operation irrespective of the execution of the changing operation, and
- wherein during the job, in a case that the second adjusting operation is not executed in a period from a last changing operation to a present changing operation, the forming of the images on the second recording material is started without forming the registration adjusting image after the present changing operation is executed.

3. An image forming apparatus according to claim 1, wherein the controller is configured to execute a first adjusting operation for executing the adjusting operation with execution of the changing operation and a second adjusting operation for executing the adjusting operation irrespective of the execution of the changing operation, and
- wherein during the job, in a case that the second adjusting operation is executed in a period from a last changing operation to a present changing operation, the registration adjusting image is formed with execution of the present changing operation and then the forming of the images on the second recording material is started.

4. An image forming apparatus according to claim 1, further comprising:
- a first storing portion configured to store a first adjusting value acquired by executing the adjusting operation when the position of the inner roller is a first position; and
- a second storing portion configured to store a second adjusting value acquired by executing the adjusting operation when the position of the inner roller is a second position,
- wherein the controller is capable of carrying out control so that when the toner images are formed with the inner roller at the first position, adjustment of the image writing positions is made by using the first adjusting value stored in the first storing portion and so that when the toner images are formed with the inner roller at the second position, the adjustment of the image writing positions is made by using the second adjusting value stored in the second storing portion.

5. An image forming apparatus comprising:
- a plurality of image forming portions configured to form toner images;
- a rotatable endless belt on which the toner images are formed by the image forming portions;
- a plurality of stretching rollers configured to stretch the belt, the stretching rollers including an inner roller configured to form a transfer portion where the toner images are transferred from the belt onto a recording material and including an upstream roller provided upstream of and adjacent to the inner roller with respect to a rotational direction of the belt;
- an outer roller provided opposed to the inner roller and configured to form the transfer portion between the outer roller and the inner roller;
- a pressing member provided upstream of the inner roller and downstream of the upstream roller with respect to the rotational direction of the belt and configured to be contactable to an inner peripheral surface of the belt and be capable of pressing the belt from an inner peripheral surface side toward an outer peripheral surface side of the belt;
- a position changing mechanism configured to change a position of the pressing member;
- an image detecting portion configured to detect an image; and
- a controller configured to execute an adjusting operation in which a registration adjusting image is formed by the image forming portions and is detected by the image detecting portion and then in which on the basis of a detection result of the registration adjusting image by the image detecting portion, adjustment of image writing positions of the image forming portions is made, wherein during execution of a job for forming first toner images on a first recording material and second toner images on a second recording material subsequent to the first recording material, in a case that a changing operation for changing the position of the pressing member by the position changing mechanism after the first toner images are formed on the first recording material and before the second toner images are transferred onto the second recording material is executed, the registration adjusting image is formed between the first toner images and the second toner images.

6. An image forming apparatus according to claim 5, wherein the controller is capable of executing a first adjusting operation for executing the adjusting operation with execution of the changing operation and a second adjusting operation for executing the adjusting operation irrespective of the execution of the changing operation, and wherein during the job, in a case that the second adjusting operation is not executed in a period from a last changing operation to a present changing operation, the forming of the images on the second recording material is started without forming the registration adjusting image after the present changing operation is executed.

7. An image forming apparatus according to claim 5, wherein the controller is capable of executing a first adjusting operation for executing the adjusting operation with execution of the changing operation and a second adjusting operation for executing the adjusting operation irrespective of the execution of the changing operation, and wherein during the job, in a case that the second adjusting operation is executed in a period from a last changing operation to a present changing operation, the registration adjusting image is formed with execution of the present changing operation and then the forming of the images on the second recording material is started.

8. An image forming apparatus according to claim 7, wherein the position changing mechanism changes the position of the pressing member to a first position and a second position, and wherein the pressing member is separated from the belt when the pressing member is positioned in the first position and presses the belt when the pressing member is positioned in the second position.

9. An image forming apparatus according to claim 7, wherein the position changing mechanism changes the position of the pressing member to a first position and a second position, and wherein the pressing member presses the belt by a first pressing amount when the pressing member is positioned in the first position and presses the belt by a second pressing amount greater than the first pressing amount when the pressing member is positioned in the second position.

10. An image forming apparatus according to claim 5, further comprising:

a first storing portion configured to store a first adjusting value acquired by executing the adjusting operation when the position of the pressing member is a first position; and a second storing portion configured to store a second adjusting value acquired by executing the adjusting operation when the position of the pressing member is a second position, wherein the controller is capable of carrying out control so that when the toner images are formed with the inner roller at the first position, adjustment of the image writing positions is made by using the first adjusting value stored in the first storing portion and so that when the toner images are formed with the inner roller at the second position, the adjustment of the image writing positions is made by using the second adjusting value stored in the second storing portion.

11. An image forming apparatus comprising:

a plurality of image forming portions configured to form toner images;

a rotatable endless belt on which the toner images are formed by the image forming portions;

a plurality of stretching rollers configured to stretch the belt, the stretching rollers including an inner roller configured to form a transfer portion where the toner mages are transferred from the belt onto a recording material and including an upstream roller provided upstream of and adjacent to the inner roller with respect to a rotational direction of the belt;

an outer roller provided opposed to the inner roller and configured to form the transfer portion between the outer roller and the inner roller;

a pressing member provided upstream of the inner roller and downstream of the upstream roller and configured to be contactable to an inner peripheral surface of the belt and be capable of pressing the belt from an inner peripheral surface side toward an outer peripheral surface side of the belt;

a position changing mechanism configured to change a position of the pressing member to a first position and a second position;

an image detecting portion configured to detect a registration adjusting image formed by the image forming portions;

a controller configured to execute an adjusting operation for adjusting image writing positions of the image forming portions, wherein the adjusting operation is an operation in which the registration adjusting image is formed by the image forming portions and then in which on the basis of a detection result of the formed registration adjusting image by the image detecting portion, an adjusting value for adjusting the image writing positions is acquired;

a first storing portion configured to store a first adjusting value acquired by the controller by executing the adjusting operation when the position of the pressing member is the first position; and a second storing portion configured to store a second adjusting value acquired by the controller by executing the adjusting operation when the position of the pressing member is the second position.

12. An image forming apparatus according to claim 11, wherein the controller is capable of executing a first adjusting operation for executing the adjusting operation with a changing operation for changing the position of the pressing member and a second adjusting operation for periodically executing the adjusting operation irrespective of the execution of the changing operation, and wherein during a job for forming toner images on a first recording material and a second recording material subsequent to the first recording material, in a case that the second adjusting operation is not executed in a period from a last changing operation to a present changing operation, the controller is configured so that the writing of the images on the second recording material is started without forming the registration adjusting image after the present changing operation is executed.

13. An image forming apparatus according to claim 12, wherein the pressing member is separated from the belt when the pressing member is positioned in the first position and presses the belt when the pressing member is positioned in the second position.

14. An image forming apparatus according to claim 12, wherein the pressing member presses the belt by a first pressing amount when the pressing member is positioned in the first position and presses the belt by a second pressing amount greater than the first pressing amount when the pressing member is positioned in the second position.

15. An image forming apparatus according to claim 11, wherein the controller is capable of executing a first adjusting operation for executing the adjusting operation with a changing operation for changing the position of the pressing member and a second adjusting operation for periodically executing the adjusting operation irrespective of the execution of the changing operation, and wherein during a job for forming toner images on a first recording material and a second recording material subsequent to the first recording material, in a case that the second adjusting operation is executed in a period from a last changing operation to a present changing operation, the controller is configured so that the registration adjusting image is formed with execution of the present changing operation and then the writing of the images on the second recording material is started.

* * * * *